US012300957B2

(12) United States Patent
Hamner et al.

(10) Patent No.: US 12,300,957 B2
(45) Date of Patent: May 13, 2025

(54) CONTACT ASSEMBLY FOR A CABLE CARD ASSEMBLY OF AN ELECTRICAL CONNECTOR

(71) Applicant: TE Connectivity Solutions GmbH, Schaffhausen (CH)

(72) Inventors: Richard Elof Hamner, Hummelstown, PA (US); Tracy Lee Smith, Harrisburg, PA (US); Bruce Allen Champion, Camp Hill, PA (US); Matthew Jeffrey Sypolt, Harrisburg, PA (US); Jared Evan Rossman, York Haven, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 268 days.

(21) Appl. No.: 17/741,378

(22) Filed: May 10, 2022

(65) Prior Publication Data

US 2023/0369784 A1 Nov. 16, 2023

(51) Int. Cl.

| | |
|---|---|
| ***H01R 13/6592*** | (2011.01) |
| ***H01R 9/05*** | (2006.01) |
| ***H01R 12/71*** | (2011.01) |
| ***H01R 13/6585*** | (2011.01) |

(52) U.S. Cl.

CPC ......... *H01R 9/0515* (2013.01); *H01R 12/716* (2013.01); *H01R 13/6585* (2013.01); *H01R 13/6592* (2013.01)

(58) Field of Classification Search

CPC .... H01R 9/0515; H01R 13/6585–6592; H01R 13/716

See application file for complete search history.

(56) References Cited

U.S. PATENT DOCUMENTS

| | | | | |
|---|---|---|---|---|
| 8,840,432 | B2 | 9/2014 | Alden, III et al. | |
| 9,203,193 | B2 * | 12/2015 | Hackman | H01R 13/648 |
| 9,437,949 | B2 | 9/2016 | Behziz et al. | |
| 10,170,862 | B2 | 1/2019 | Weidner et al. | |
| 10,411,374 | B2 | 9/2019 | Tanaka et al. | |
| 11,189,943 | B2 | 11/2021 | Zerebilov et al. | |
| 12,003,061 | B2 | 6/2024 | Rossman et al. | |
| 2012/0298395 | A1 * | 11/2012 | Gundel | H04L 41/28 174/105 R |
| 2019/0288422 | A1 | 9/2019 | Champion et al. | |
| 2021/0367364 | A1 * | 11/2021 | Phillips | H01R 24/62 |
| 2022/0221137 | A1 | 1/2022 | Rita et al. | |

* cited by examiner

*Primary Examiner* — Ross N Gushi
*Assistant Examiner* — Carlos E Lopez-Pagan

(57) ABSTRACT

A cable card assembly includes a circuit card having mating conductors at a mating end for mating with a mating electrical connector and circuit conductors at s cable end. The cable card assembly includes cables having signal conductors and cable shields. The cable card assembly includes a contact assembly coupled to the circuit card and coupled to the cables and a contact holder holding signal contacts. Each signal contact includes a base tab terminated to the corresponding circuit conductor and a mating tab terminated to the corresponding signal conductor. The cable card assembly includes a ground bus separate and discrete from the contact assembly and coupled to the contact assembly. The ground bus is electrically connected to the cable shields to electrically connect the cable shields of the cables.

24 Claims, 18 Drawing Sheets

CONTACT ASSEMBLY FOR A CABLE CARD ASSEMBLY OF AN ELECTRICAL CONNECTOR

BACKGROUND OF THE INVENTION

The subject matter herein relates generally to electrical connectors.

Electrical connectors are typically used to electrically couple various types of electrical devices to transmit signals between the devices. At least some known electrical connectors include a cable assembly having cables connected between the electrical device and the electrical connector. The cables each have a signal conductor or a differential pair of signal conductors surrounded by a shield layer that, in turn, is surrounded by a cable jacket. The shield layer includes a conductive foil, which functions to shield the signal conductor(s) from electromagnetic interference (EMI) and generally improve performance. A drain wire may be provided at the cable core electrically connected to the conductive foil. At an end of the communication cable, the cable jacket, the shield layer, and insulation that covers the signal conductor(s) may be removed (e.g., stripped) to expose the signal conductor(s) and the drain wire. The exposed portions of the signal conductor(s) are then mechanically and electrically coupled (e.g., soldered) to corresponding conductors, such as signal pads of a circuit card. The exposed portions are bent and manipulated between the insulator and the signal pads on the circuit card.

However, signal integrity and electrical performance of the electrical connectors are negatively impacted at the interface between the cables and the circuit card. For example, as the exposed portions of the signal conductors transition to the circuit card, the exposed portions are exposed to air, which affects signal integrity and detrimentally affects performance. Additionally, the spacing between the signal conductors changes as the signal conductors transition, which affects signal integrity. Moreover, the spacing between the signal conductors and the shielding changes as the signal conductors transition, which affects signal integrity. The signal conductor bending and termination suffers from problems in repeatability of the process. The termination between the signal conductors and the signal pads of the circuit card are areas of high stress and potential failure.

Accordingly, there is a need for an electrical connector having an improved connection interface with a circuit card.

BRIEF DESCRIPTION OF THE INVENTION

In one embodiment, a cable card assembly for an electrical connector is provided and includes a circuit card having an upper surface and a lower surface. The circuit card has a cable end and a mating end opposite the cable end. The circuit card has mating conductors at the mating end for mating with a mating electrical connector. The circuit card has circuit conductors at the cable end. The circuit card has a ground plane. The cable card assembly includes cables terminated to the circuit card. The cables include signal conductors and cable shields surrounding the corresponding signal conductors to provide electrical shielding for the signal conductors. The signal conductors include exposed portions extending forward of the cable shields. The cable card assembly includes a contact assembly coupled to the circuit card and coupled to the cables. The contact assembly includes a contact holder holding signal contacts. Each signal contact includes a base tab and a mating tab. The base tab is terminated to the corresponding circuit conductor. The mating tab is terminated to the corresponding signal conductor. The cable card assembly includes a ground bus separate and discrete from the contact assembly and is coupled to the contact assembly. The ground bus is electrically connected to the cable shields to electrically connect the cable shields of the cables. The ground bus is electrically connected to the ground plane of the circuit card.

In another embodiment, a cable card assembly for an electrical connector is provided and includes a circuit card having an upper surface and a lower surface. The circuit card has a cable end at a rear of the circuit card and a mating end at a front of the circuit card. The circuit card has mating conductors at the mating end for mating with a mating electrical connector. The circuit card has circuit conductors at the cable end. The circuit conductors are arranged in a first row and a second row forward of the first row. The circuit card has a ground plane. The cable card assembly includes cables terminated to the circuit card. The cables include signal conductors and cable shields surrounding the corresponding signal conductors to provide electrical shielding for the signal conductors. The signal conductors include exposed portions extending forward of the cable shields. The cables include inner cables and outer cables. The inner cables are located between the outer cables and the circuit card. The cable card assembly includes a first contact assembly coupled to the circuit card and coupled to the inner cables. The first contact assembly including a first contact holder holding first signal contacts. Each first signal contact including a base tab and a mating tab. The base tab is terminated to the corresponding circuit conductor in the first row. The mating tab is terminated to the signal conductor of the corresponding inner cable. The cable card assembly includes a second contact assembly coupled to the circuit card and coupled to the outer cables. The second contact assembly including a second contact holder holding second signal contacts. Each second signal contact including a base tab and a mating tab. The base tab is terminated to the corresponding circuit conductor in the second row. The mating tab is terminated to the signal conductor of the corresponding outer cable. The cable card assembly includes a first ground bus separate and discrete from the first contact assembly and is coupled to the first contact assembly. The first ground bus is electrically connected to the cable shields of the inner cables to electrically connect the cable shields of the inner cables. The first ground bus is electrically connected to the ground plane of the circuit card. The cable card assembly includes a second ground bus separate and discrete from the second contact assembly and is coupled to the second contact assembly. The second ground bus is electrically connected to the cable shields of the outer cables to electrically connect the cable shields of the outer cables. The second ground bus is electrically connected to the ground plane of the circuit card.

In a further embodiment, an electrical connector is provided and includes a housing having walls forming a cavity. The housing has a mating end at a front of the housing configured to be mated with a mating electrical connector. The housing includes a cable card assembly received in the cavity of the housing. The cable card assembly includes a circuit card, a contact assembly coupled to the circuit card, cables terminated to the contact assembly, and a ground bus coupled to the circuit card. The circuit card has an upper surface and a lower surface. The circuit card has a cable end and a mating end opposite the cable end. The circuit card includes a ground plane. The circuit card has circuit conductors at the cable end. The circuit card has mating conductors at the mating end. The mating end of the circuit card configured to be plugged into a card slot of the mating electrical connector. The cables include signal conductors and cable shields surrounding the corresponding signal conductors to provide electrical shielding for the signal conductors. The signal conductors have exposed portions extending forward of the cable shields. The contact assembly including a contact holder holding signal contacts. Each signal contact including a base tab and a mating tab. The base tab is terminated to the corresponding circuit conductor. The mating tab is terminated to the corresponding signal conductor. The ground bus is electrically connected to the cable shields to electrically connect the cable shields of the cables. The ground bus is electrically connected to the ground plane of the circuit card.

DETAILED DESCRIPTION OF THE INVENTION

Figure 1:
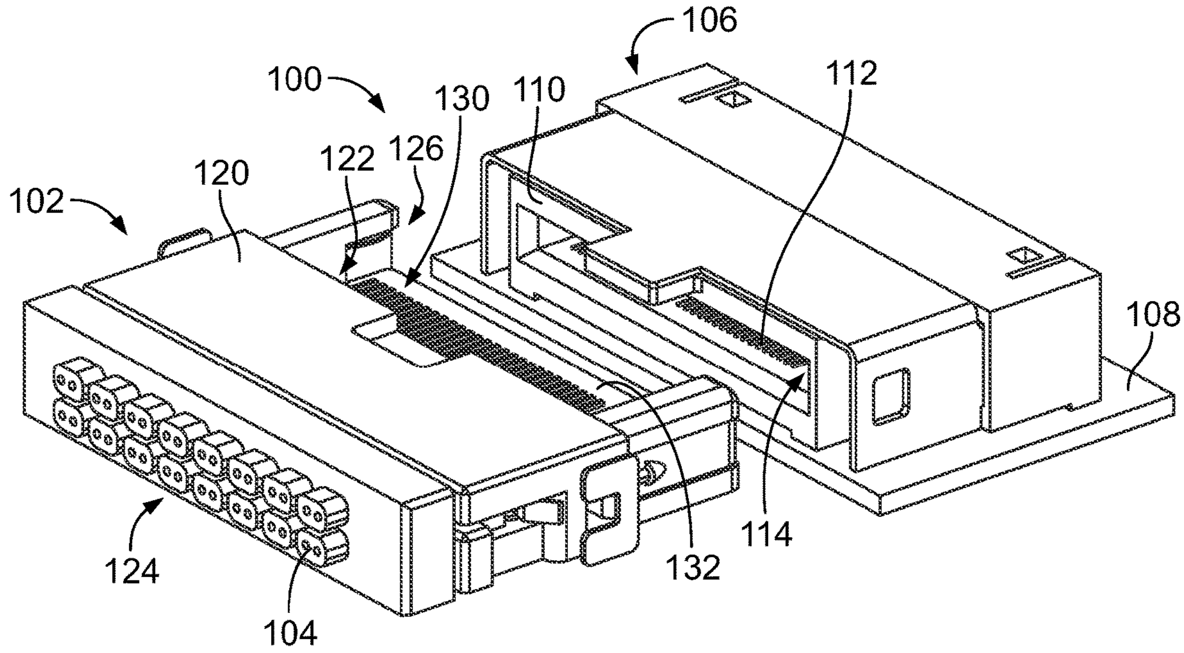
FIG. 1 is a perspective view of a communication system in accordance with an exemplary embodiment.

FIG. 1 is a perspective view of a communication system 100 in accordance with an exemplary embodiment. The communication system 100 includes a first electrical connector 102 provided at ends of cables 104 and a second electrical connector 106 mounted to a circuit board 108. In other various embodiments, the second electrical connector 106 may be provided at ends of cables (not shown). In an exemplary embodiment, the second electrical connector 106 is a receptacle connector, and may be referred to herein after as a receptacle connector 106. The first electrical connector 102 is mated to the second electrical connector 106. In an exemplary embodiment, the first electrical connector 102 is a plug connector configured to be pluggably coupled to the receptacle connector 106. For example, a portion of the plug connector 102 may be plugged into a receptacle of the receptacle connector 106. In an exemplary embodiment, the plug connector 102 is coupled to the receptacle connector 106 at a separable interface. For example, the plug connector 102 is latchably coupled to the receptacle connector 106. The connectors 102, 106 may be input-output (I/O) connectors.

The receptacle connector 106 includes a receptacle housing 110 holding an array of contacts 112. In an exemplary embodiment, the receptacle housing 110 includes a card slot 114 forming the receptacle receiving the plug connector 102. The contacts 112 have separable mating interfaces. The contacts 112 may define a compressible interface, such as including deflectable spring beams that are compressed when the plug connector 102 is received in the card slot 114. Optionally, the contacts 112 may be arranged in multiple rows along the top and the bottom of the card slot 114. In various embodiments, the receptacle connector 106 is a communication device, such as a card edge socket connector. However, the receptacle connector 106 may be another type of electrical connector in an alternative embodiment, such as a serial attached SCSI (SAS) connector. The receptacle connector 106 may be a high-speed connector.

The plug connector 102 includes a housing 120 having a cavity 122 that receives a cable card assembly 130. The housing 120 has a cable end 124 and a mating end 126 opposite the cable end 124. The cables 104 extend from the cable end 124. The mating end 126 is configured to be coupled to the receptacle connector 106. The cable card assembly 130 includes a circuit card 132. The cables 104 are configured to be terminated to the circuit card 132. The circuit card 132 is configured to be plugged into the card slot 114 when the plug connector 102 is mated with the receptacle connector 106.

Figure 2:
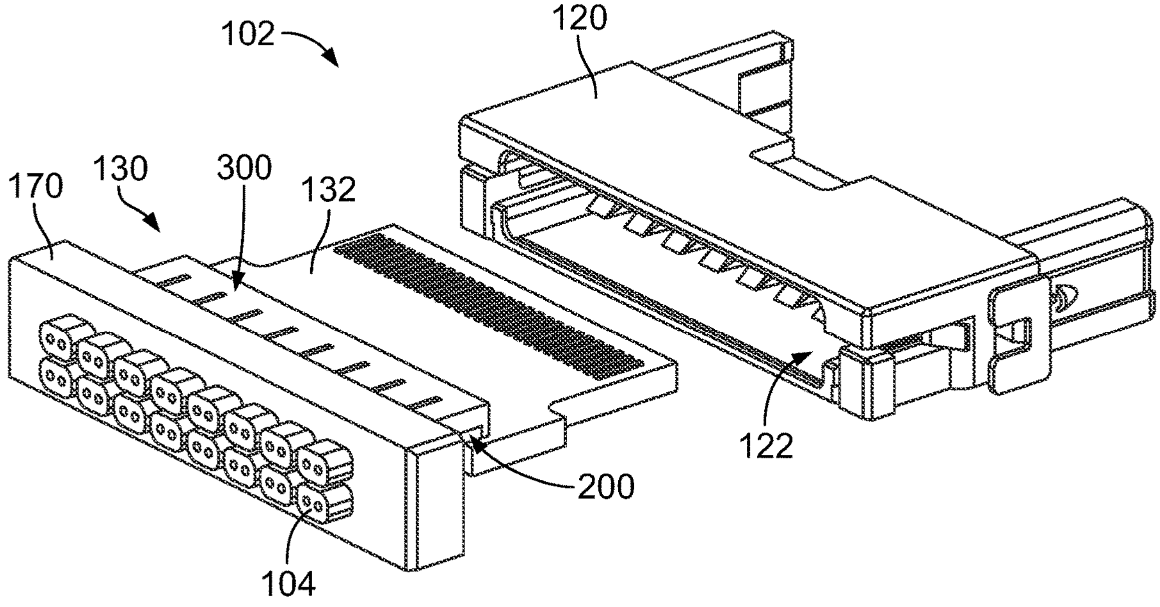
FIG. 2 is an exploded view of the plug connector in accordance with an exemplary embodiment.

FIG. 2 is an exploded view of the plug connector 102 in accordance with an exemplary embodiment. The plug connector 102 includes the housing 120 and the cable card assembly 130. The housing 120 receives the cable card assembly 130 in the cavity 122 to hold the circuit card 132 and the cables 104. In an exemplary embodiment, the cable card assembly 130 includes a contact assembly 200 and a ground bus 300 separate and discrete from the contact assembly 200. The contact assembly 200 is coupled to the cables 104, such as signal conductors of the cables 104. The contact assembly 200 is coupled to the circuit card 132. For example, the contact assembly 200 is electrically connected to circuits or conductors of the circuit card 132. The ground bus 300 is coupled to the cables 104, such as cables shields of the cables 104. The ground bus 300 is coupled to the circuit card 132. For example, the ground bus 300 is electrically connected to circuits or conductors of the circuit card 132, such as to a ground plane of the circuit card 132.

The ground bus 300 provides electrical shielding for the signal conductors of the cables 104 and for signal contacts of the contact assembly 200. The ground bus 300 is electrically connected to the shield structures of the cables 104, such as to cable shields of the cables 104 and/or drain wires of the cables 104. In an exemplary embodiment, the ground bus 300 is soldered to the cable shields. However, the ground bus 300 may be electrically connected to the shield structures of the cables 104 by other means in alternative embodiments, such as soldering to the drain wire, welding to the drain wire, press-fitting the drain wire into a compliant feature of the ground bus 300, using conductive adhesive, using a conductive tape or braid, using a conductive gasket, conductive foam, conductive epoxy, and the like. The ground bus 300 may be coupled to the circuit card 132 at a solderless connection, such as at an interference or press-fit connection. In various embodiments, multiple ground buses 300 may be provided, such as at top and/or at the bottom sides of the circuit card 132. The multiple ground buses 300 may be offset, such as shifted front-to-rear and/or side-to-side.

During assembly, the cables 104 are terminated to the contact assembly 200 and the contact assembly 200 is terminated to the circuit card 132. The ground bus 300 is then terminated to the cables 104 and the circuit card 132. The cable card assembly 130, including the circuit card 132, the cables 104, the contact assembly 200, and the ground bus 300, may be loaded into the housing 120, such as into a rear of the housing 120. The cable card assembly 130 may be secured in the housing 120 using latches, fasteners or other securing devices. In an exemplary embodiment, the ends of the cables 104 may be surrounded by a strain relief element 170. For example, the strain relief element 170 may be molded or otherwise formed around the cables 104. The strain relief element 170 may be secured to the circuit card 132, such as being molded to the circuit card 132. Optionally, multiple strain relief elements 170 may be provided, such as upper and lower strain relief elements.

Figure 3:
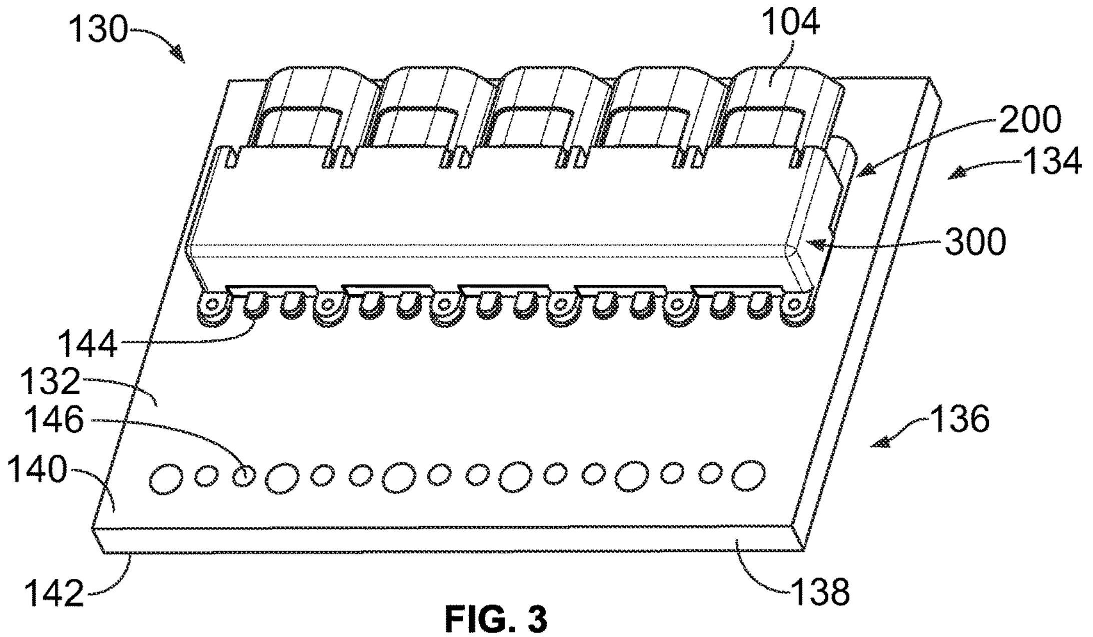
FIG. 3 is a perspective view of a portion of the cable card assembly in accordance with an exemplary embodiment showing a single row of cables.
Figure 4:
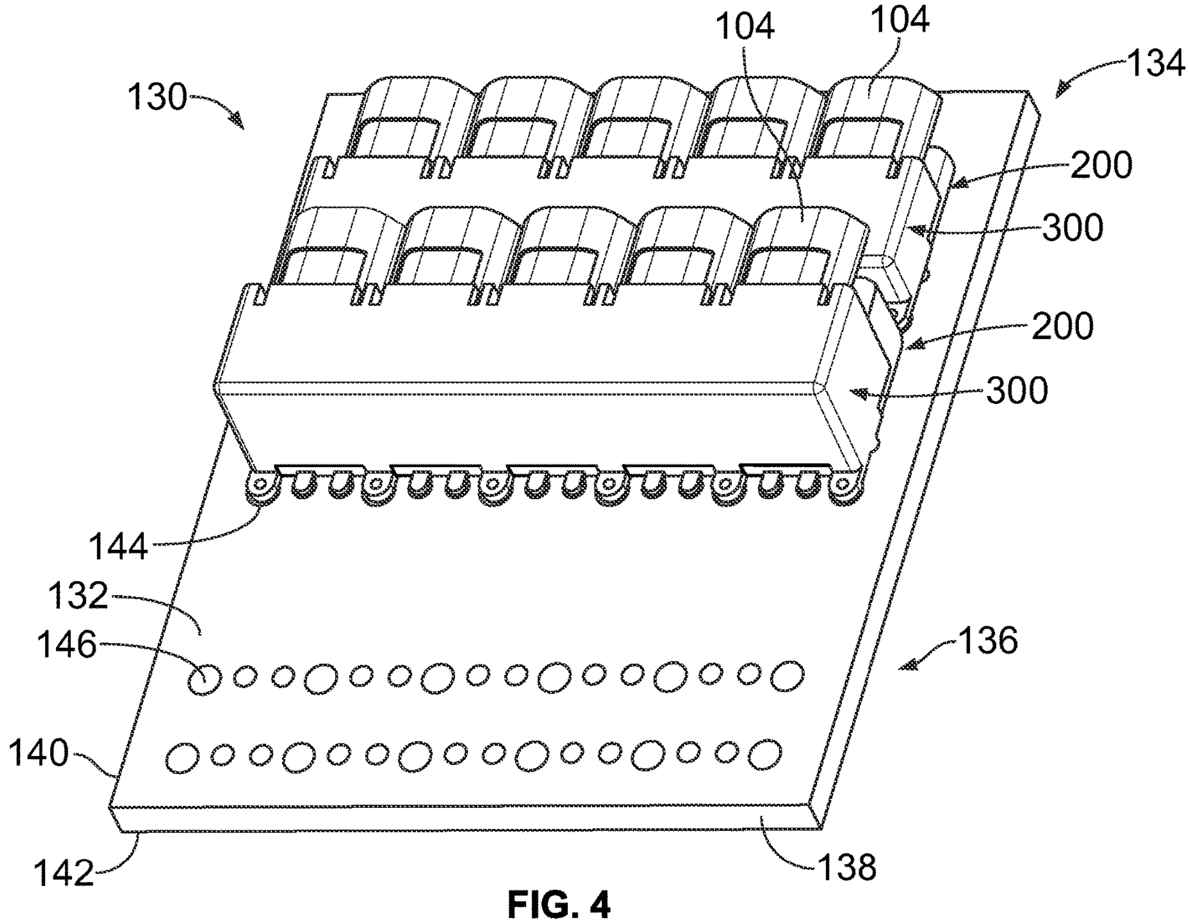
FIG. 4 is a perspective view of a portion of the cable card assembly in accordance with an exemplary embodiment showing two rows of cables.

FIG. 3 is a perspective view of a portion of the cable card assembly 130 in accordance with an exemplary embodiment showing a single row of cables 104. FIG. 4 is a perspective view of a portion of the cable card assembly 130 in accordance with an exemplary embodiment showing two rows of cables 104. The cable card assembly 130 includes the circuit card 132, the cables 104, the contact assembly(ies) 200 terminated to the circuit card 132, and the corresponding ground bus(es) 300. In the illustrated embodiment, with the single row of cables 104 (FIG. 3), a single contact assembly 200 and corresponding ground bus 300 is utilized. However, with the double row of cables 104 (FIG. 4), each row includes the corresponding contact assembly 200 and ground bus 300. More than two rows may be provided in alternative embodiments. Additionally, the cable card assembly 130 may additionally include any number of rows of cables 104, contact assemblies 200 and ground buses 300 on the opposite side of the circuit card 132. The contact assemblies 200 and ground buses 300 are similar for both rows. However, the contact assemblies 200 and ground buses 300 may be sized and shaped differently to accommodate the stacking (for example, flyover) situation.

The circuit card 132 extends between a cable end 134 (for example, rear portion) and a mating end 136 (for example, front portion). The circuit card 132 has a rear edge at the rear of the cable end 134 and the cables are configured to be coupled to the circuit card 132 at the cable end 134 and extend rearward from the circuit card 132. The circuit card 132 has a card edge 138 at the front of the mating end 136 configured to be plugged into the card slot 114 (shown in FIG. 1) of the receptacle connector 106 (shown in FIG. 1). The circuit card 132 includes an upper surface 140 and a lower surface 142. The circuit card 132 may have any reasonable length between the cable end 134 and the mating end 136, depending on the particular application, and may have electrical components mounted to the circuit card 132 between the cable end 134 and the mating end 136.

The circuit card 132 includes circuit conductors 144 at the cable end 134 configured to be electrically connected to the signal contacts of the contact assembly 200 and/or the ground bus 300. The circuit conductors 144 may be pads or traces of the circuit card 132. In various embodiments, the circuit conductors 144 are provided at the cable end 134 forward of the rear edge of the circuit card 132, such as in the rear half of the circuit card 132. The circuit conductors 144 may be provided at both the upper surface 140 and the lower surface 142. However, the in alternative embodiments, the cable end 134 is defined at the top of the circuit card 132 and the circuit conductors 144 are provided only on the upper surface 140, such as between the front and the rear edges of the circuit card 132. The circuit conductors 144 include both signal conductors and ground conductors. The ground conductors may be electrically connected to a ground plane (not shown) of the circuit card 132. Optionally, the circuit conductors 144 may be arranged in a ground-signal-signal-ground arrangement. The lengths and/or widths of the signal conductors may be different than the ground conductors. The positioning of the signal conductors on the circuit card 132 (for example, depth from the rear edge of the circuit card 132) may be different than the ground conductors. The spacing between the signal conductors (i.e., pitch) may be different than the spacing between the signal conductors and the ground conductors.

The circuit card 132 includes circuit conductors that define mating conductors 146 at the mating end 136 configured to be electrically connected to corresponding contacts 112 (shown in FIG. 1) of the receptacle connector 106. The mating conductors 146 are electrically connected to corresponding circuit conductors 144 through traces, vias or other circuits of the circuit card 132. The mating conductors 146 include both signal conductors and ground conductors. The ground conductors 146 may be electrically connected to a ground plane (not shown) of the circuit card 132. The mating conductors 146 may be pads or traces of the circuit card 132. The mating conductors 146 may be provided at both the upper surface 140 and the lower surface 142. The mating conductors 146 are provided proximate to the card edge 138. However, in alternative embodiments, the mating end 136 is defined by the bottom of the circuit card 132 and the mating conductors 146 are provided only on the lower surface 142, such as for mating with socket contacts of a socket connector.

The cables 104 are terminated to the contact assembly 200 and the contact assembly 200 is terminated to the circuit card 132. The ground bus 300 is terminated to the cables 104 and the circuit card 132. The contact assembly 200 provides an electrical interface between the cables 104 and the circuit card 132. The contact assembly 200 controls routing of signals from the cables 104 to the circuit card 132. The ground bus 300 provides electrical shielding for the contact assembly 200. The ground bus 300 provides electrical shielding at the interface with the cables 104. The ground bus provides electrical shielding at the interface with the circuit card 132.

Figure 5:
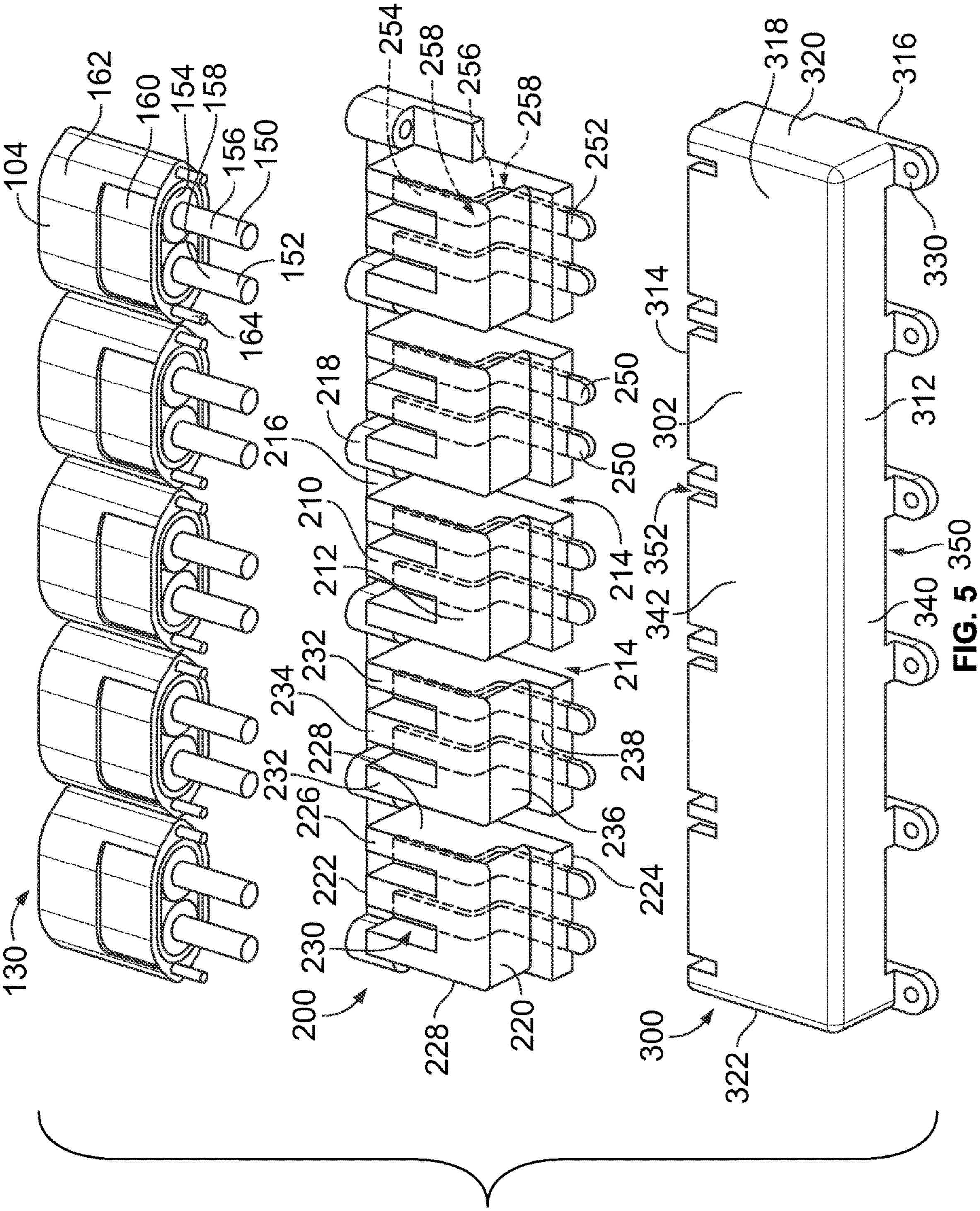
FIG. 5 is an exploded view of a portion of the cable card assembly in accordance with an exemplary embodiment showing a plurality of the cables, the contact assembly, and the ground bus.

FIG. 5 is an exploded view of a portion of the cable card assembly 130 in accordance with an exemplary embodiment showing a plurality of the cables 104, the contact assembly 200, and the ground bus 300. The contact assembly 200 provides a connectorized interface between the cables 104 and the circuit card 132 (shown in FIG. 3). The contact assembly 200 enhances electrical performance of the cable card assembly 130, such as by controlling routing of the signal paths, controlling the dielectric material surrounding the signal paths, and providing robust interfaces between the circuit card 132 and the cables 104. The ground bus 300 provides electrical shielding for signals transmitted between the circuit card 132 and the cables 104. The ground bus 300 enhances electrical performance of the cable card assembly 130, such as by reducing cross talk.

Each cable 104 includes at least one signal conductor and a shield structure providing electrical shielding for the at least one signal conductor. In an exemplary embodiment, the cables 104 are twin-axial cables. For example, each cable 104 includes a first signal conductor 150 and a second signal conductor 152. The signal conductors 150, 152 carry differential signals. The signal conductors 150, 152 are configured to be electrically connected to corresponding circuit conductors 144 of the circuit card 132 through the contact assembly 200.

The cable 104 includes an insulator 154 surrounding the signal conductors 150, 152 and a cable shield 160 surrounding the insulator 154. The cable shield 160 provides circumferential shielding around the signal conductors 150, 152. The cable 104 includes a cable jacket 162 surrounding the cable shield 160. In various embodiments, the cable 104 includes one or more drain wires 164 electrically connected to the cable shield 160. In alternative embodiments, the cable 104 is provided without a drain wire.

In an exemplary embodiment, the cable jacket 162, the cable shield 160, and the insulator 154 may be removed (e.g., stripped) to expose portions of the signal conductors 150, 152, respectively, which are referred to hereinafter as exposed portions 156, 158. The exposed portions 156, 158 of the signal conductors 150, 152 are configured to be mechanically and electrically coupled (e.g., soldered) to corresponding signal contacts 250 of the contact assembly 200. In an exemplary embodiment, the exposed portions 156, 158 extend axially (for example, straight outward or forward) from the insulator 154 to distal ends. However, the exposed portions 156, 158 may be bent, such as bent inward toward each other (distance between reduced for tighter coupling and smaller trace spacing) and/or may be bent toward the circuit card 132. The cable shield 160 does not extend along the exposed portions 156, 158. However, the ground bus 300 extends along the exposed portions 156, 158 and provides shielding for the exposed portions 156, 158. The ground bus 300 is shaped and positioned relative to the exposed portions 156, 158 to control impedance along the signal paths. For example, the ground bus 300 may be shaped and positioned relative to the exposed portions 156, 158 to maintain a target impedance along the signal paths (for example, 50 Ohms, 75 Ohms, 100 Ohms, and the like).

The contact assembly 200 includes a contact holder 210 holding a plurality of signal contacts 250. In an exemplary embodiment, the signal contacts 250 are arranged in pairs. The contact holder 210 is manufactured from a dielectric material, such as a plastic material. The contact holder 210 is formed around the signal contacts 250 in various embodiments. For example, the signal contacts 250 may be formed as a lead frame and the contact holder 210 is overmolded around the lead frame. However, in alternative embodiments, the contact holder 210 may be preformed and the signal contacts 250 may be loaded or stitched into the contact holder 210. In an exemplary embodiment, the contact holder 210 is a single, unitary piece molded around all of the signal contacts 250. However, in alternative embodiments, the contact holder 210 may be formed by multiple pieces or holder elements each holding corresponding signal contacts 250, such as each holding the corresponding pair of the signal contacts 250.

The contact holder 210 includes contact blocks 212 separated by gaps 214. Each contact block 212 holds the corresponding signal contacts 250, such as each holding the corresponding pair of the signal contacts 250. The gaps 214 separate portions of the contact blocks 212. The gaps 214 are configured to receive portions of the ground bus 300 to allow electrical shielding between the contact blocks 212. In an exemplary embodiment, the contact blocks 212 are connected by a connecting wall 216 at a rear of the contact holder 210. In various embodiments, the contact holder 210 includes mounting lugs 218 at the rear of the contact holder 210. The mounting lugs 218 are configured to be mounted to the ground bus 300 to connect the ground bus 300 to the contact assembly 200. The mounting lugs 218 may include mounting features, such as openings, posts, latches, clips, or other mounting features used to secure the contact assembly 200 to the ground bus 300. Each of the contact blocks 212 and the connecting wall 216 may be co-molded during a single molding process. However, in alternative embodiments, the contact holder 210 may be provided without the connecting wall 216. Rather, each connecting block 212 is separate and discrete from the other contact blocks 212.

The contact holder 210 extends between a front 220 and a rear 222. The rear 222 is configured to face the cables 104. The contact holder 210 includes an inner end 224 and an outer end 226. The inner end 224 is configured to face the circuit card 132. The contact holder 210 may be oriented such that the inner end 224 is a bottom of the contact holder 210. Each contact block 212 has sides 228 that face the gaps 214. The sides 228 extend between the front 220 and the rear 222. The connecting wall 216 is provided at the rear 222. In an exemplary embodiment, the gaps 214 are open at the front 220. The gaps 214 may be open at the inner end 224 and/or the outer end 226.

In an exemplary embodiment, the contact holder 210 includes contact channels 230. The signal contacts 250 pass through the contact holder 210 within the contact channels 230. In various embodiments, the signal contacts 250 may be loaded into the channels 230. In other various embodiments, the contact holder 210 may be molded around the signal contacts 250 to form the contact channels 230. In an exemplary embodiment, the contact channels 230 receive the exposed portions 156, 158 of the signal conductors 150, 152 for electrical connection of the signal conductors 150, 152 to the signal contacts 250 within the contact channels 230. For example, the contact channels 230 may be open at the rear 222 to receive the signal conductors 150, 152. The contact channels 230 may be open at the outer end 226 to receive the signal conductors 150, 152. In various embodiments, the signal conductors 150, 152 are soldered or laser welded to the signal contacts 250 within the contact channels 230.

In an exemplary embodiment, each connecting block 212 of the contact holder 210 includes side walls 232 on the sides of the contact channels 230. The side walls 232 isolate the signal contacts 250 from the ground bus 300. The thicknesses and heights of the side walls 232 may be selected or controlled to electrically tune the contact assembly 200. For example, the thicknesses and heights of the side walls 232 may be selected for impedance matching between the signal contacts 250 and the ground bus 300. In an exemplary embodiment, each connecting block 212 of the contact holder 210 includes a separating wall 234 between the contact channels 230. The separating wall 234 isolates the signal contacts 250 from each other. The thickness and height of the separating wall 234 may be selected or controlled to electrically tune the contact assembly 200. For example, the thickness and height of the separating wall 234 may be selected for impedance matching between the signal contacts 250. In an exemplary embodiment, each connecting block 212 of the contact holder 210 includes a front wall 236 forward of portions of the signal contacts 250. The front wall 236 isolates the signal contacts 250 from the ground bus 300. The thickness and height of the front wall 236 may be selected or controlled to electrically tune the contact assembly 200. For example, the thickness and height of the front wall 236 may be selected for impedance matching between the signal contacts 250 and the ground bus 300. In an exemplary embodiment, each connecting block 212 of the contact holder 210 includes an inner wall 238 at the inner end 224, such as at the front 220. The inner wall 238 isolates the signal contacts 250 from the ground bus 300. The thickness and height of the inner wall 238 may be selected or controlled to electrically tune the contact assembly 200. For example, the thickness and height of the inner wall 238 may be selected for impedance matching between the signal contacts 250 and the ground bus 300. In various embodiments, the contact channels 230 may be open at the inner end 224 along the inner wall 238 such that the signal contacts 250 may be mated to the circuit card 132. Optionally, portions of the signal contacts 250 may extend forward of the inner wall 238.

The signal contacts 250 are routed through the contact holder 210 to provide signal paths between the signal conductors 150, 152 and the circuit card 132. In an exemplary embodiment, the signal contacts 250 are stamped and formed contacts. In various embodiments, the signal contacts 250 may be formed as a lead frame on a carrier strip (not shown), which is later removed after the contact holder 210 is overmolded around the signal contacts 250.

Each signal contact 250 includes a base tab 252 and a mating tab 254. The signal contact 250 includes a transition portion 256 between the base tab 252 and the mating tab 254. The transition portion 256 includes one or more bends 258 to transition between the base tab 252 and the mating tab 254. The transition portion 256 transitions out of plane relative to the base tab 252 and the mating tab 254. For example, the transition portion 256 may extend generally perpendicular to the base tab 252 and generally perpendicular to the mating tab 254. The contact assembly 200 may be oriented such that the transition portion 256 extends vertically.

The base tab 252 is configured to be terminated to the corresponding circuit conductor 144 (shown in FIG. 3) of the circuit card 132. In various embodiments, the base tab 252 is a solder tab configured to be soldered to the circuit conductor 144. However, in alternative embodiments, the base tab 252 may be terminated by other processes, such as having a compliant pin that is press-fit into the circuit card 132. In an exemplary embodiment, the base tab 252 extends parallel to the inner end 224 of the contact holder 210. Each of the base tabs 252 are generally coplanar and may be co-planer with the inner end 224 of the contact holder 210. The contact assembly 200 may be oriented such that the base tabs 252 extend horizontally.

The mating tab 254 is configured to be terminated to the corresponding signal conductor 150, 152. In various embodiments, the mating tab 254 is a pad configured to be soldered or laser welded to the signal conductor 150, 152. However, in alternative embodiments, the mating tab 254 may be terminated by other processes, such as having a crimp barrel that is crimped to the signal conductor 150, 152. In an exemplary embodiment, the mating tab 254 extends parallel to the inner end 224. Each mating tab 254 may be generally coplanar. The contact assembly 200 may be oriented such that the mating tabs 254 extend horizontally. In an exemplary embodiment, the mating tabs 254 are located remote from the inner end 224 and remote from the outer end 226. For example, the mating tabs 254 may be approximately centered between the inner end 224 and the outer end 226. For example, a portion of the contact holder 210 extends above the mating tabs 254 and a portion of the contact holder 210 extends below the mating tabs 254.

Figure 6:
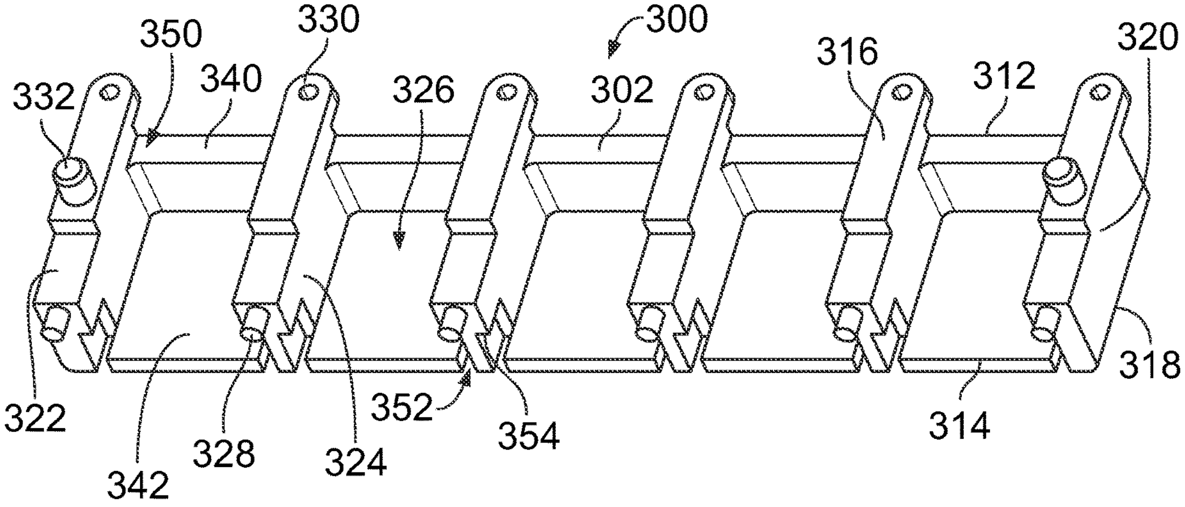
FIG. 6 is a bottom perspective view of the ground bus in accordance with an exemplary embodiment.

With additional reference to FIG. 6, which is a bottom perspective view of the ground bus 300, the ground bus 300 is configured to be coupled to the contact assembly 200 to provide electrical shielding for the signal contacts 250 and the signal conductors 150, 152. The ground bus 300 includes a shell 302 manufactured from a conductive material, such as a metal material to provide electrical shielding. In various embodiments, the ground bus 300 may be a diecast component. In other various embodiments, the ground bus 300 may be a stamped and formed component. In the illustrated embodiment, the shell 302 of the ground bus 300 is manufactured as a single, unitary component. However, in alternative embodiments, the ground bus 300 may be manufactured from discrete components that are mechanically and electrically connected together.

The ground bus 300 extends between a front 312 and a rear 314. The rear 314 is configured to face the cables 104. The ground bus 300 extends between an inner end 316 and an outer end 318. In various embodiments, the inner end 316 is at the bottom and is configured to face the circuit card 132.

The inner end 316 may be mounted to the circuit card 132 to mechanically and electrically connect the ground bus 300 to the circuit card 132. The ground bus 300 includes a first side wall 320 and a second side wall 322 extending between the front 312 and the rear 314. In an exemplary embodiment, the ground bus 300 includes divider walls 324 extending parallel to and spaced apart from the side walls 320, 322. The divider walls 324 form cavities 326 between the divider walls 324. The cavities 326 receive corresponding contact blocks 212 (shown in FIG. 5). The cavities 326 may receive the ends of the cables 104. The divider walls 324 are received in corresponding gaps 214 (shown in FIG. 5). The divider walls 324 provide electrical shielding between the cavities 326, such as for shielding between the pairs of signal contacts 250 (shown in FIG. 5).

In an exemplary embodiment, the divider walls 324 include mounting features 328 for connecting the ground bus 300 to the contact assembly 200. In the illustrated embodiment, the mounting features 328 are posts extending from the rear 314. The posts are configured be received in openings in the mounting lugs 218 (shown in FIG. 5).

The ground bus 300 includes mounting tabs 330 used for mounting the ground bus 300 to the circuit card 132 (shown in FIG. 3). In the illustrated embodiment, the mounting tabs 330 are provided at the front 312 of the ground bus 300. The mounting tabs 330 are located at the inner end 316 to interface with the circuit card 132. In the illustrated embodiment, the mounting tabs 330 are aligned with the side walls 320, 322 and the divider walls 324. The mounting tabs 330 are configured to be mechanically and electrically connected to the circuit card 132. For example, the mounting tabs 330 may be soldered to the circuit card 132. Other types of mounting features may be used in alternative embodiments to mechanically and electrically connect the ground bus 300 to the circuit card 132.

In an exemplary embodiment, the side walls 320, 322 include mounting posts 332 for connecting the ground bus 300 to the circuit card 132. The mounting posts 332 are used to position the ground bus 300 relative to the circuit card 132. For example, the mounting posts 332 may be received in openings in the circuit card 132 to align the mounting tabs 330 with corresponding pads or conductors on the circuit card 132.

In an exemplary embodiment, the ground bus 300 includes a front wall 340 at the front 312 and an outer wall 342 at the outer end 318. The front wall 340, the outer wall 342, the side walls 320, 322, and the divider walls 324 provide electrical shielding for the cavities 326. The front wall 340, the outer wall 342, the side walls 320, 322, and the divider walls 324 form shield cavities 326 around the signal contacts 250 and the signal conductors 150, 152. In an exemplary embodiment, the outer wall 342 is configured to be electrically connected to the cable shields 160 of the cables 104 (shown in FIG. 5). For example, the outer wall 342 may be soldered to the cable shield 160. Alternatively, a ground connection member (not shown) may provide an electrical connection between the ground bus 300 and the cable shields 160. For example, a conductive tape or conductive braid may span between the outer wall 342 and the cable shields 160.

In an exemplary embodiment, the ground bus 300 includes openings 350 between the front wall 340 and the inner end 316. Portions of the contact assembly 200 may pass through the openings 350. For example, the inner walls 238 and the base tabs 252 may pass through the openings 350. However, in alternative embodiments, the front wall 340 may extend to the inner end 316. For example, the front wall 340 may be located forward of the base tabs 252 such that the signal contacts are fully enclosed within the shield cavity 326 of the ground bus 300.

In an exemplary embodiment, the ground bus 300 includes slots 352 in the outer wall 342. The slots 352 extend along the side walls 320, 322 and the divider walls 324. The slots 352 extend to the support walls 354. The slots 352 provide access to the drain wires 164 (shown in FIG. 5), such as for laser welding the drain wires 164 to the support walls 354.

Figure 7:
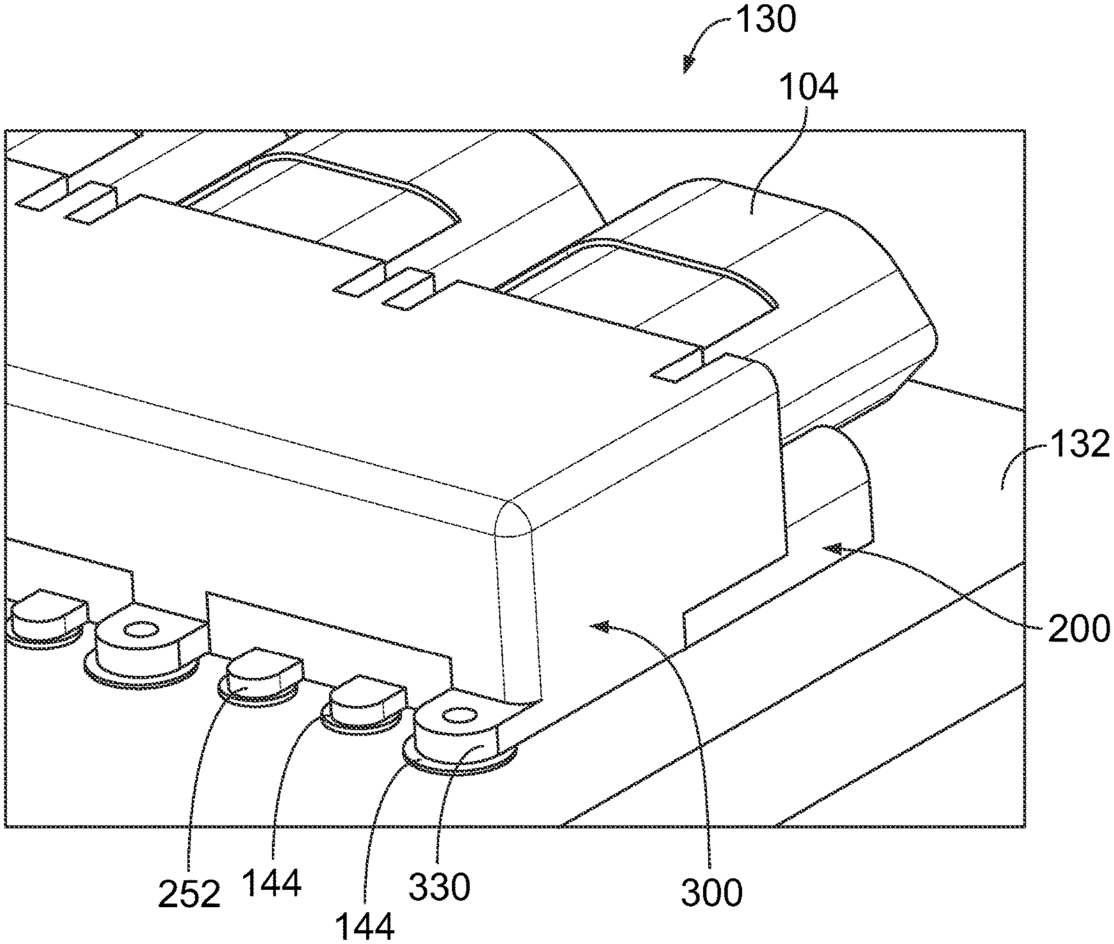
FIG. 7 is a perspective view of a portion of the cable card assembly in accordance with an exemplary embodiment.

FIG. 7 is a perspective view of a portion of the cable card assembly 130 in accordance with an exemplary embodiment. FIG. 7 shows the contact assembly 200 and the ground bus 300 mounted to the circuit card 132. The base tabs 252 of the signal contacts 250 are connected to corresponding circuit conductors 144. For example, the base tabs 252 may be soldered to the circuit conductors 144. The signal contacts 250 provide in interface between the cables 104 and the circuit card 132. The ground bus 300 provides electrical shielding for the signal contacts 250 and the cables 104. The mounting tabs 330 of the ground bus 300 are connected to corresponding circuit conductors 144. For example, the mounting tabs 330 may be soldered to the circuit conductors 144.

Figure 8:
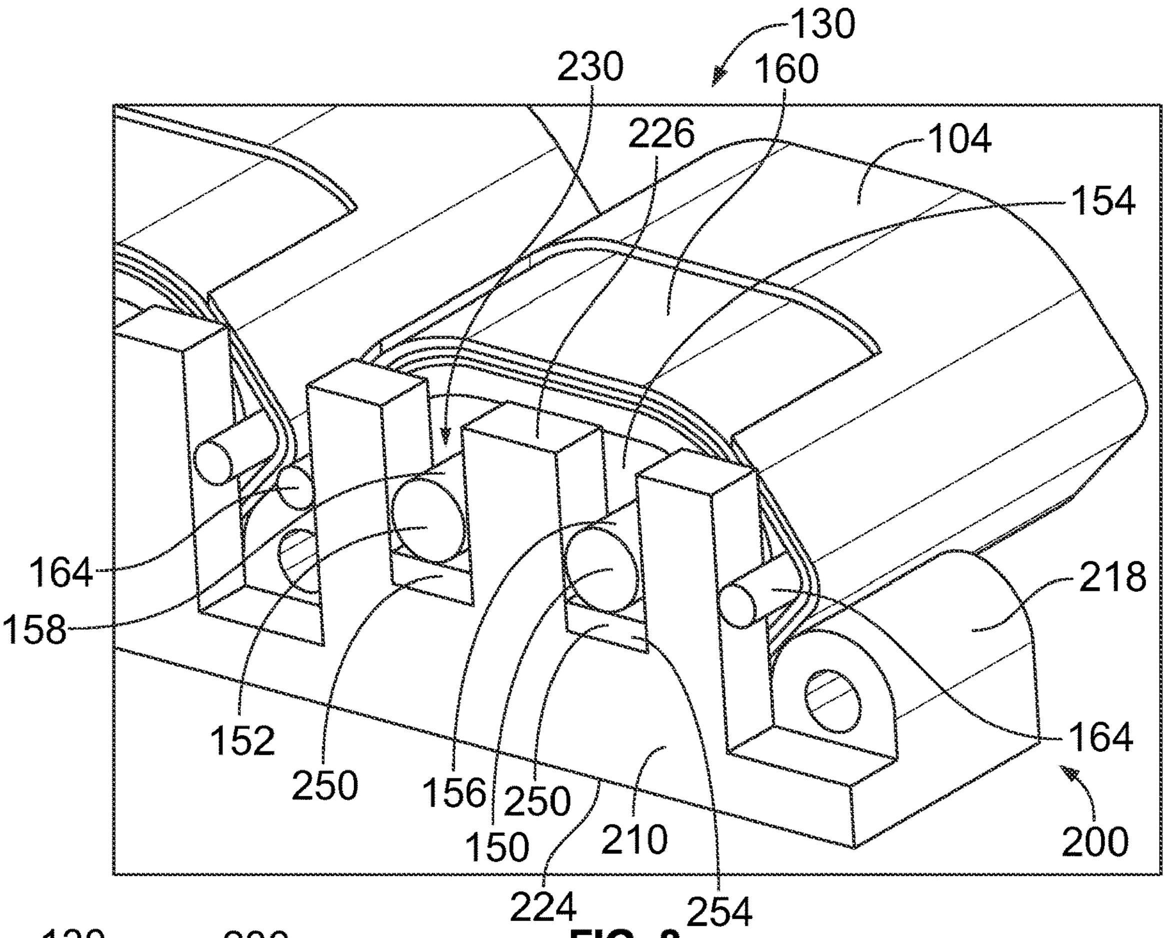
FIG. 8 is a front perspective, partial sectional view of a portion of the cable card assembly in accordance with an exemplary embodiment.
Figure 9:
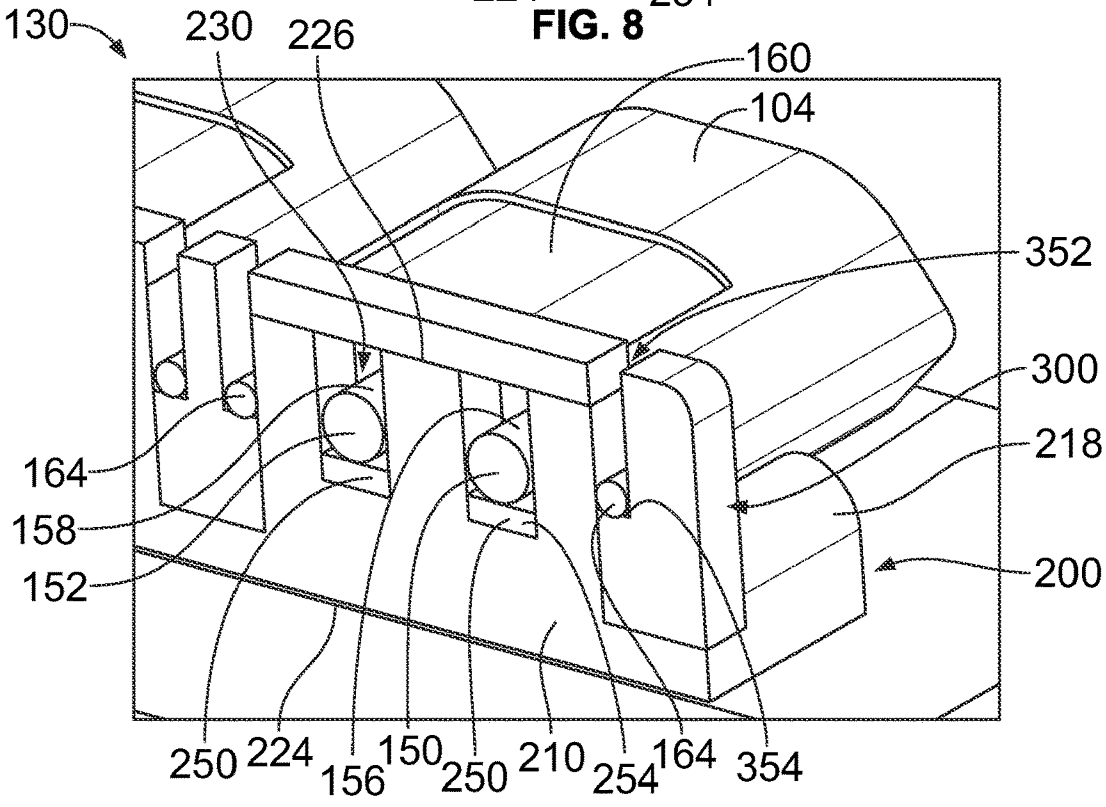
FIG. 9 is a front perspective, partial sectional view of a portion of the cable card assembly in accordance with an exemplary embodiment.
Figure 10:
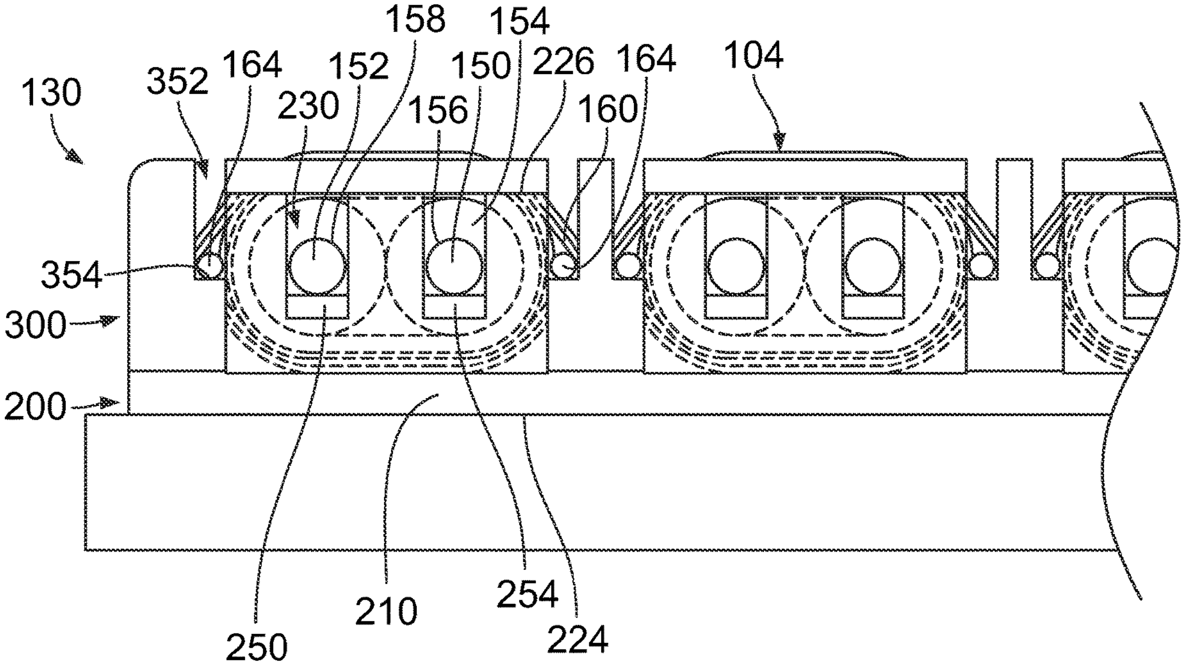
FIG. 10 is a cross-sectional view of a portion of the cable card assembly in accordance with an exemplary embodiment.

FIG. 8 is a front perspective, partial sectional view of a portion of the cable card assembly 130 in accordance with an exemplary embodiment. FIG. 9 is a front perspective, partial sectional view of a portion of the cable card assembly 130 in accordance with an exemplary embodiment. FIG. 10 is a cross-sectional view of a portion of the cable card assembly 130 in accordance with an exemplary embodiment. FIG. 8 shows the cables 104 coupled to the contact assembly 200 with the ground bus 300 (FIG. 9) removed to illustrate the cables 104 relative to the contact assembly 200. FIGS. 9 and 10 show the ground bus 300 coupled to the contact assembly 200 and the cables 104.

The signal contacts 250 are located in the contact channels 230. The contact holder 210 supports the mating tabs 254 of the signal contacts 250 at an elevated height above the inner end 224 of the contact holder 210. For example, the contact holder 210 forms a shelf that supports the mating tab 254 at a height that corresponds to the exit location of the exposed portions 156, 158 of the signal conductors 150, 152. As such, the signal conductors 150, 152 may extend axially for termination to the mating tabs 254. For example, the signal conductors 150, 152 may extend straight forward from the insulator 154 into the contact channels 230 to interface with the mating tabs 254. In an exemplary embodiment, prior to connecting the ground bus 300 to the contact assembly 200, the contact channels 230 are open at the outer end 226 for laser welding the signal conductors 150, 152 to the mating tabs 254.

During assembly, the ground bus 300 is coupled to the contact assembly 200. For example, the ground bus 300 may be coupled to the mounting lugs 218. The drain wires 164 of the cable 104 are received in the slots 352 in the ground bus 300. The drain wires 164 rest on the support walls 354. The slots 352 are open at the top of the ground bus 300 for laser welding the drain wires 164 to the support walls 354. The drain wires 164 create an electrical path between the ground bus 300 and the cable shield 160 of the cable 104.

Figure 11:
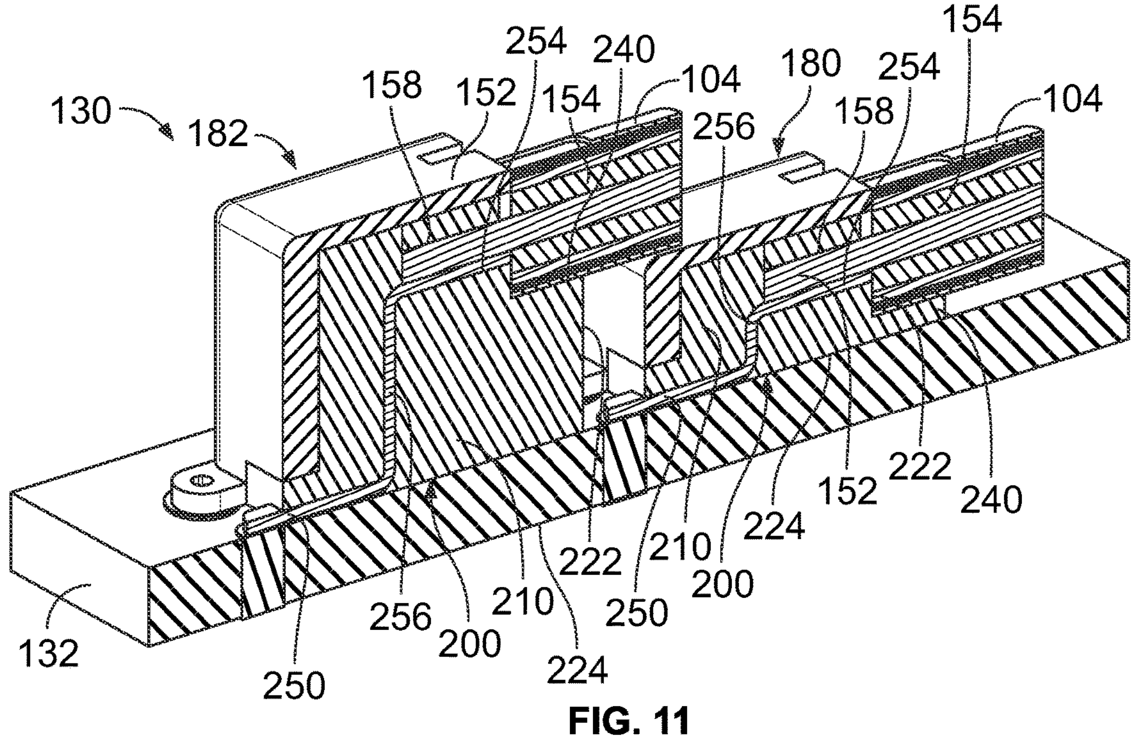
FIG. 11 is a front perspective, partial sectional view of a portion of the cable card assembly in accordance with an exemplary embodiment.

FIG. 11 is a front perspective, partial sectional view of a portion of the cable card assembly 130 in accordance with an exemplary embodiment. FIG. 11 illustrates a first assembly 180 and a second assembly 182 located forward of and extending over the first assembly 180. The second assembly 182 is a stacked or flyover assembly. Utilizing two of the assemblies 180, 182 increases the density of signal paths and cables 104 that may be connected to the circuit card 132. The assemblies 180, 182 include similar components and the like components identified with like reference numerals. However, the second assembly 182 is sized and shaped differently to accommodate stacking the cables 104 associated with the second assembly 182 over the first assembly 180. For example, the signal contacts 250 of the second assembly 182 are taller (transition portions 256 are different lengths) than the signal contacts 250 of the first assembly 180 for mating with the cables 104 at different vertical heights above the circuit card 132.

In an exemplary embodiment, the contact holder 210 includes a cable support 240 at the rear 222 of the contact holder 210. The cable support 240 is used to support the cable 104 relative to the contact holder 210. The cable support 240 of the first assembly 180 is located a first distance from the inner end 224, and thus the circuit card 132. The cable support 240 of the second assembly 182 is located a second distance from the inner end 224, and thus the circuit card 132. The second distance is greater than the first distance to support the cables 104 at different heights. The second distance is greater than the overall height of the first assembly 180 to support the cable 104 of the second assembly 182 at a height above the first assembly 180. The cable support 240 is located relative to the mating tabs 254 of the signal contacts 250 to allow the signal conductors 150 (shown in FIG. 10), 152 to extend straight out of the insulator 154 onto the mating tabs 254. As such, stress between the signal conductors 150, 152 and the mating tabs 254 is reduced which minimizes the risk of separation or detachment of the signal conductors 150, 152 from the mating tabs 254.

Utilizing the contact assemblies 200 eliminates the need for bending the cables 104 and/or the exposed portions 156 (shown in FIG. 10), 158 of the signal conductors 150, 152 for direct connection to the circuit card 132. Assembly may be simplified. A more robust electrical connection is provided by using the contact assemblies 200 between the cables 104 and the circuit card 132. The signal paths may be more uniformly controlled for improved electrical performance. The impedance along the signal paths may be better controlled with the use of the contact assemblies 200 as compared to conventional systems that terminate the signal conductors 150, 152 directly to pads on the circuit card 132.

Figure 12:
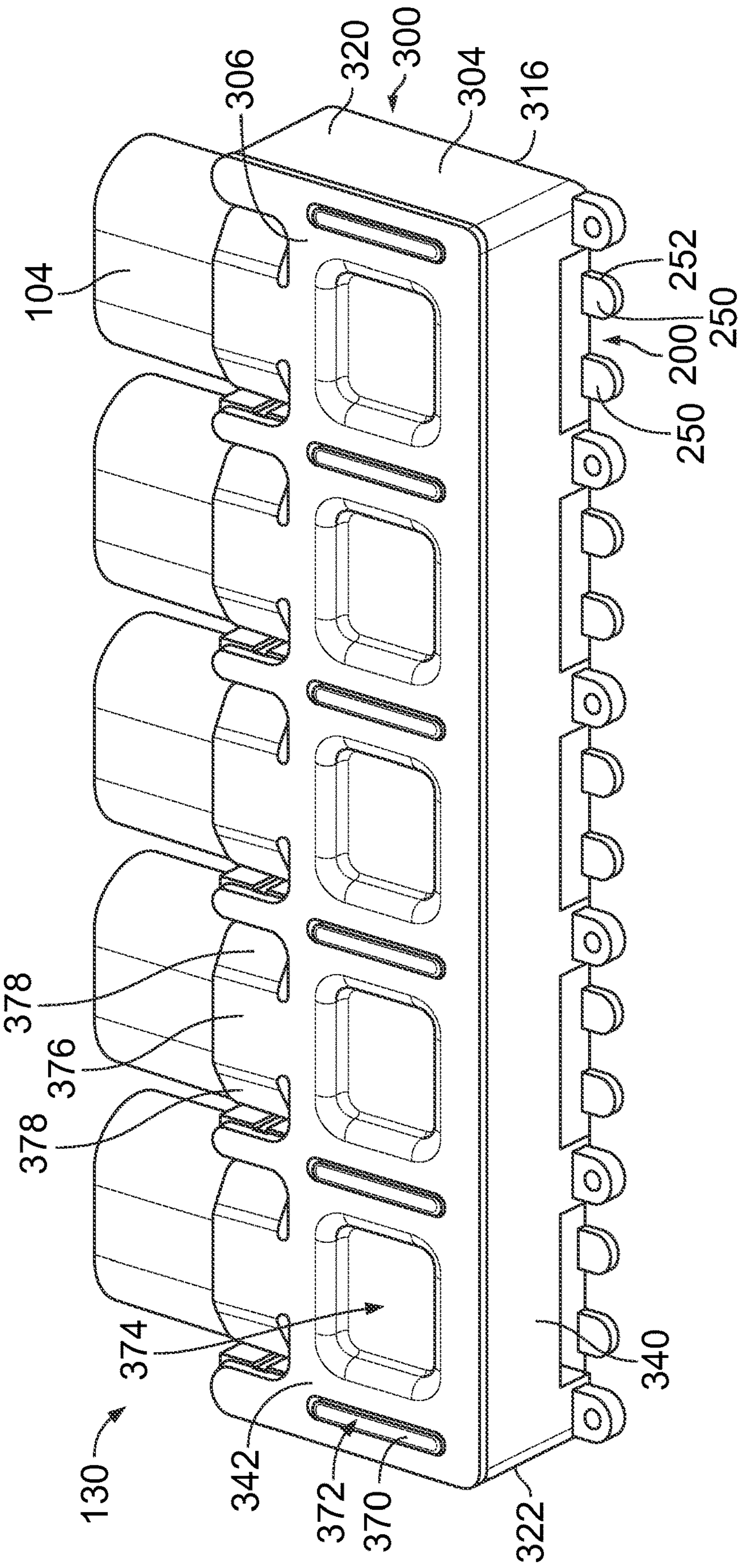
FIG. 12 is a front perspective view of a portion of the cable card assembly in accordance with an exemplary embodiment.
Figure 13:
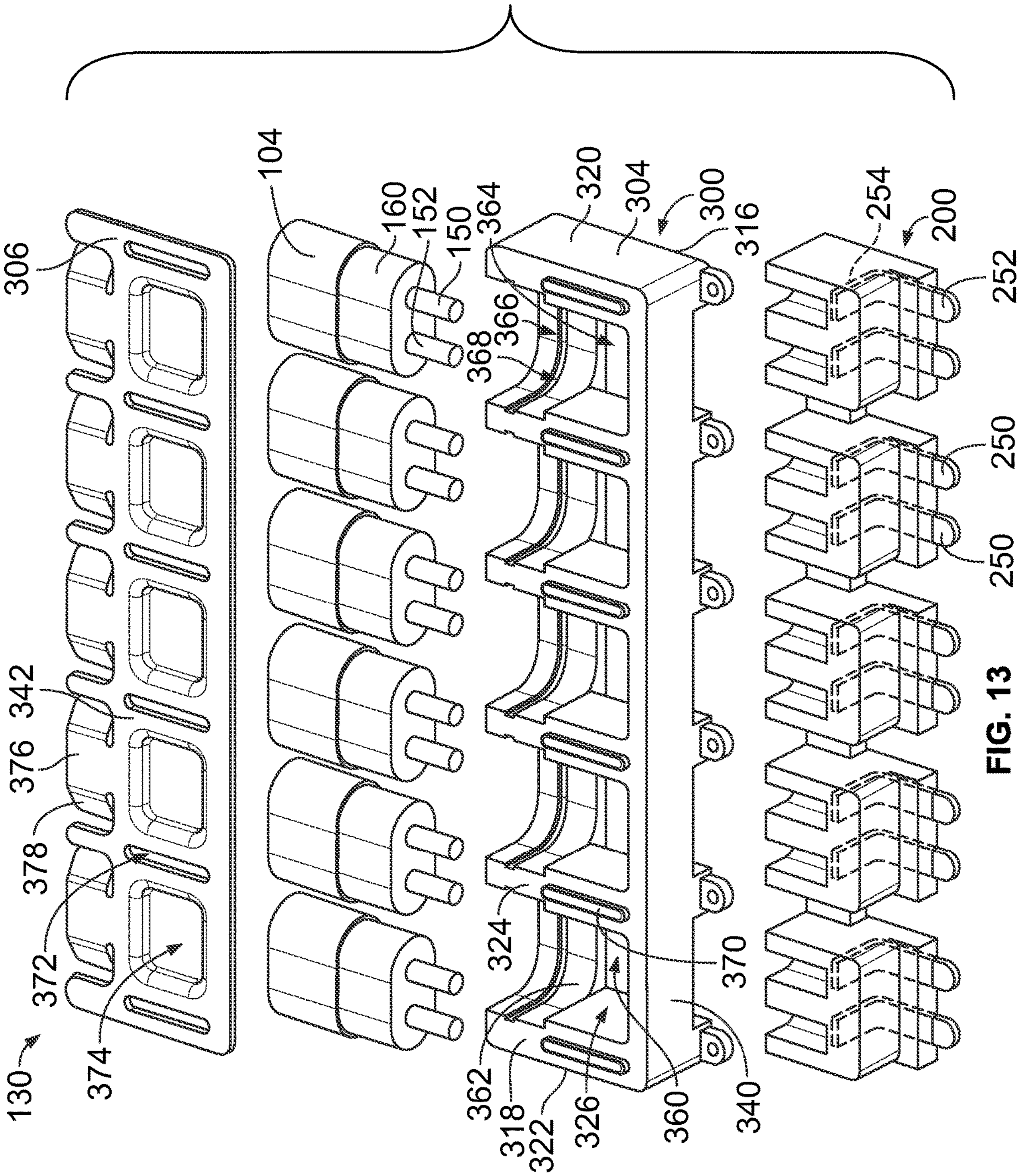
FIG. 13 is an exploded view of a portion of the cable card assembly in accordance with an exemplary embodiment.

FIG. 12 is a front perspective view of a portion of the cable card assembly 130 in accordance with an exemplary embodiment. FIG. 13 is an exploded view of a portion of the cable card assembly 130 in accordance with an exemplary embodiment. In the illustrated embodiment, the cables 104 are provided without drain wires. The ground bus 300 is configured to electrically connect directly to the cable shields 160 of the cables 104 rather than connecting through the drain wires.

In an exemplary embodiment, the ground bus 300 is a multipiece structure. The ground bus 300 includes an inner bus member 304 and an outer bus member 306. The inner bus member 304 is located between the outer bus member 306 and the circuit card (not shown). The cables 104 are received between the inner bus member 304 and the outer bus member 306. In an exemplary embodiment, both the inner bus member 304 and the outer bus member 306 are electrically connected to the cable shields 160 of the cables 104. For example, both the inner bus member 304 and the outer bus member 306 directly engage the cable shields 160 of the cables 104.

In the illustrated embodiment, the inner bus member 304 is a diecast part forming the majority of the ground bus 300, whereas the outer bus member 306 is a stamped and formed part forming a cover or lid for covering the inner bus member 304. However, in alternative embodiments, the outer bus member 306 may be a diecast part forming a significant portion of the structure of the ground bus 300. In an exemplary embodiment, the inner bus member 304 includes the side walls 320, 322, the divider walls 324, and the front wall 340. The outer bus member 306 includes the outer wall 342. In various embodiments, the outer bus member 306 may be soldered or welded to the inner bus member 304. In alternative embodiments, the outer bus member 306 may be secured to the inner bus member 304 using fasteners, latches, clips, or other securing features.

In an exemplary embodiment, the inner bus member 304 includes openings 360 at the inner end 316 that receive the contact assembly 200. The inner bus member 304 includes base walls 362 rearward of the openings 360. The base walls 362 span between the divider walls 324 and the side walls 320, 322. The base walls 362 receive and support the cables 104. In an exemplary embodiment, the cavities 326 between the divider walls 324 include contact assembly pockets 364 and cable pockets 366. The contact assembly 200 is received in the contact assembly pockets 364. The cables 104 are received in the cable pockets 366. The base walls 362 extend along the inner ends of the cable pockets 366. The base walls 362 in conjunction with the divider walls 324 and the side walls 320, 320 form the cable pockets 366 and surround three sides of the cable pockets 366. The outer bus member 306 extends along the fourth side of the cable pockets 366 to enclose or surround each of the cables 104. In an exemplary embodiment, the base wall 362 as well as the divider walls 324 and the side walls 320, 322 include a groove 368 configured to receive a conductor, such as a gasket, solder, conductive adhesive, and the like, which may electrically connect to the cable shield 160.

In an exemplary embodiment, the divider walls 324 and the side walls 320, 322 include ribs 370 extending along the outer end 318 of the inner bus member 304. The outer bus member 306 includes slots 372 that receive the ribs 370. Optionally, the ribs 370 may be deformed to mechanically and electrically connect the outer bus member 306 to the inner bus member 304. Alternatively, the outer bus member 306 is soldered or welded to the inner bus member 304 along the ribs 370.

In an exemplary embodiment, the outer bus member 306 includes embossments 374 formed in the outer bus member 306. The embossments 374 are formed inward to position portions of the outer bus member 306 closer to the signal conductors 150, 152 and the signal contacts 250, such as for impedance matching. The size and shape of the embossments 374 may be controlled to tune the impedance matching with the signal conductors 150, 152. The embossments 374 position the outer bus member 306 in closer proximity to the signal conductors 150, 152 than embodiments without the embossments 374.

In an exemplary embodiment, the outer bus member 306 includes ground connection members 376 at the rear of the outer bus member 306. The ground connection members 376 form portions of the cable pockets 366. The ground connection members 376 include tabs 378 configured to be bent inward toward the cable shield 160 of the cable 104. The ground connection members 376 may directly electrically connected to the cable shields 160. Optionally, the ground connection members 376 may electrically connect to the cable shields 160 by a compression connection. Alternatively, the ground connection members 376 may be soldered to the cable shields 160 to electrically connect the outer bus member 306 to the cable shields 160.

In an exemplary embodiment, the signal contacts 250 may be configured to be butt welded to the ends of the signal conductors 150, 152 rather than being lap welded to the sides of the signal conductors 150, 152. In the illustrated embodiment, the mating tab 254 is oriented perpendicular to the base tab 252. For example, the base tab 252 is oriented horizontally and the mating tab 254 is oriented vertically. The ends of the signal conductors 150, 152 may butt up against the rear surfaces of the mating tabs 254 for butt welding thereto.

Figure 14:
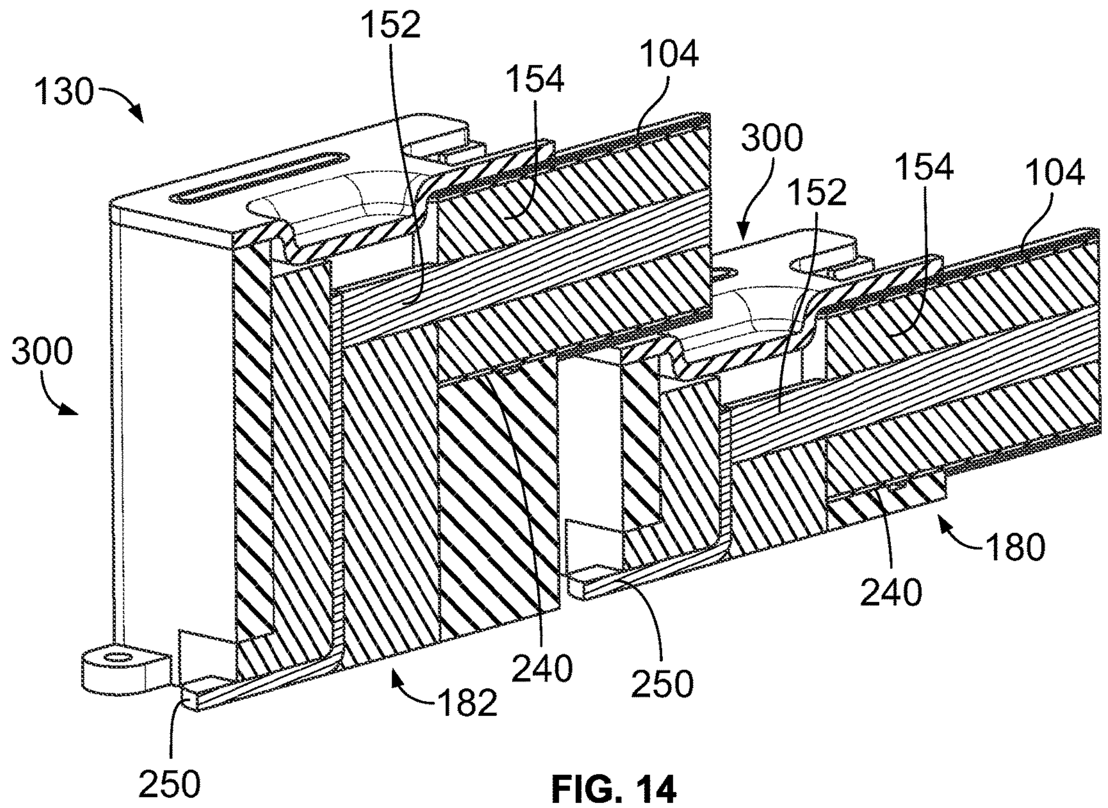
FIG. 14 is a front perspective, partial sectional view of a portion of the cable card assembly in accordance with an exemplary embodiment.

FIG. 14 is a front perspective, partial sectional view of a portion of the cable card assembly 130 in accordance with an exemplary embodiment. FIG. 14 illustrates the first assembly 180 and the second assembly 182 located forward of and extending over the first assembly 180 in the stacked or flyover arrangement. The assemblies 180, 182 are shown using the multi-piece diecast ground bus 300 shown in FIGS. 12 and 13 and using the butt weld connection between the signal contacts 250 and the signal conductors 150 (shown in FIG. 13), 152. The cable supports 240 of the assemblies 180, 182 are located at different heights to support the cables 104 at different heights and allow the signal conductors 150, 152 to extend axially from the insulators 154 to the signal contacts 250.

Figure 15:
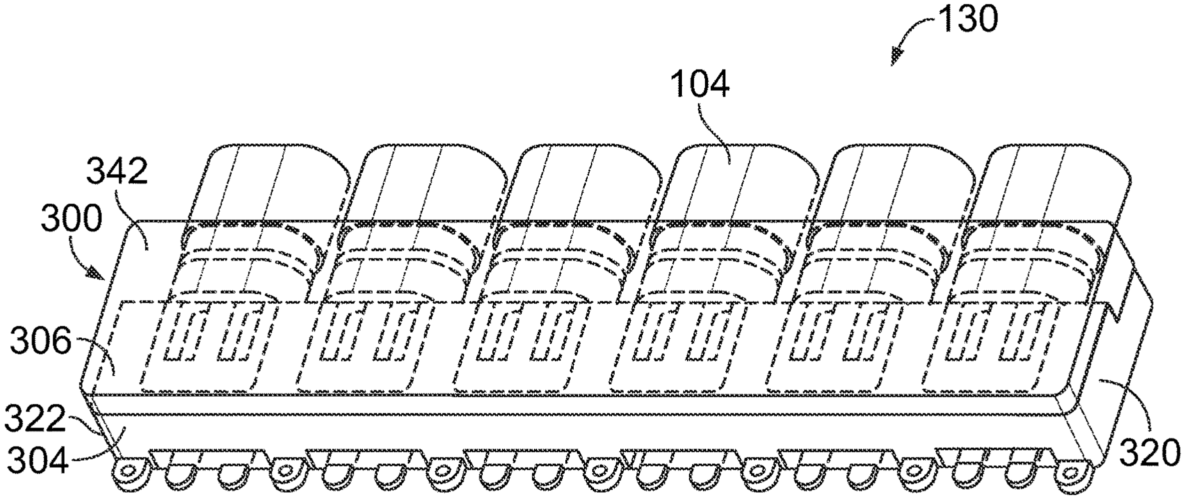
FIG. 15 is a front perspective view of a portion of the cable card assembly in accordance with an exemplary embodiment.
Figure 16:
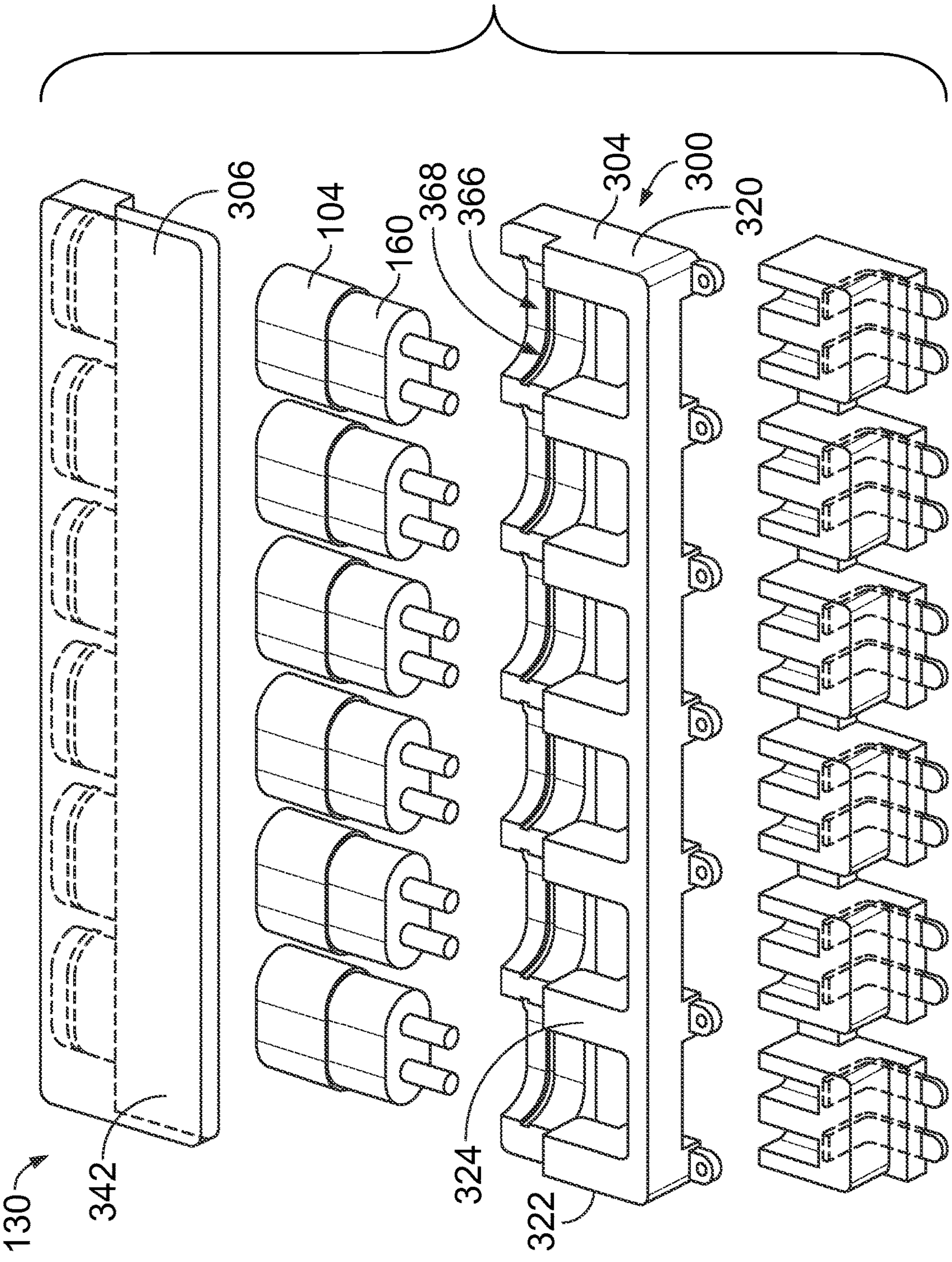
FIG. 16 is an exploded view of a portion of the cable card assembly in accordance with an exemplary embodiment.

FIG. 15 is a front perspective view of a portion of the cable card assembly 130 in accordance with an exemplary embodiment. FIG. 16 is an exploded view of a portion of the cable card assembly 130 in accordance with an exemplary embodiment. In the illustrated embodiment, the ground bus 300 is a multipiece structure. In an exemplary embodiment, the outer bus member 306 is a diecast part rather than a stamped and formed part. The outer bus member 306 includes the outer wall 342 as well as portions of the side walls 320, 322 and portions of the divider walls 324 along the cable pockets 366. The outer wall 342 forms a ground connection member that extends along the outer ends of the cable pockets 366 to connect to the cable shields 160. The inner bus member 304 and the outer bus member 306 both include grooves 368 configured to receive a gasket, which may electrically connect to the cable shield 160. The inner bus member 304 and the outer bus member 306 are configured to electrically connect directly to the cable shields 160 of the cables 104.

Figure 17:
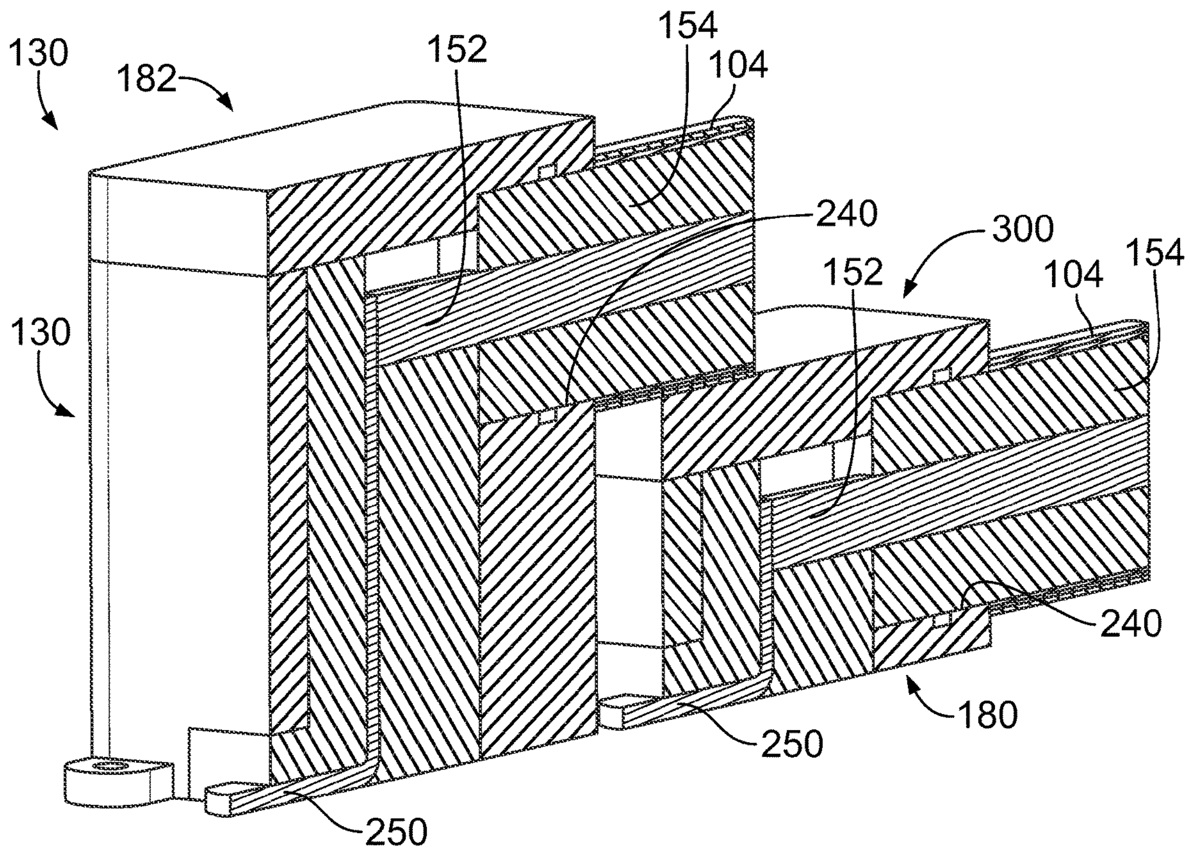
FIG. 17 is a front perspective, partial sectional view of a portion of the cable card assembly in accordance with an exemplary embodiment.

FIG. 17 is a front perspective, partial sectional view of a portion of the cable card assembly 130 in accordance with an exemplary embodiment. FIG. 17 illustrates the first assembly 180 and the second assembly 182 located forward of and extending over the first assembly 180 in the stacked or flyover arrangement. The assemblies 180, 182 are shown using the multi-piece ground bus 300 shown in FIGS. 15 and 16. The cable supports 240 of the assemblies 180, 182 are located at different heights to support the cables 104 at different heights and allow the signal conductors 150 (shown in FIG. 13), 152 to extend axially from the insulators 154 to the signal contacts 250. FIG. 17 illustrates the mating tabs 254 of the signal contacts 250 having butt weld portions.

Figure 18:
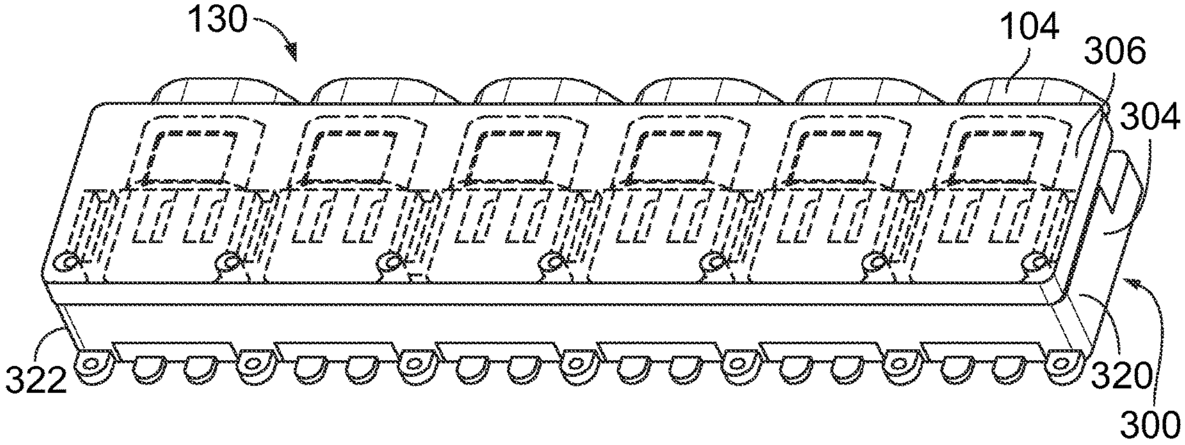
FIG. 18 is a front perspective view of a portion of the cable card assembly in accordance with an exemplary embodiment.
Figure 19:
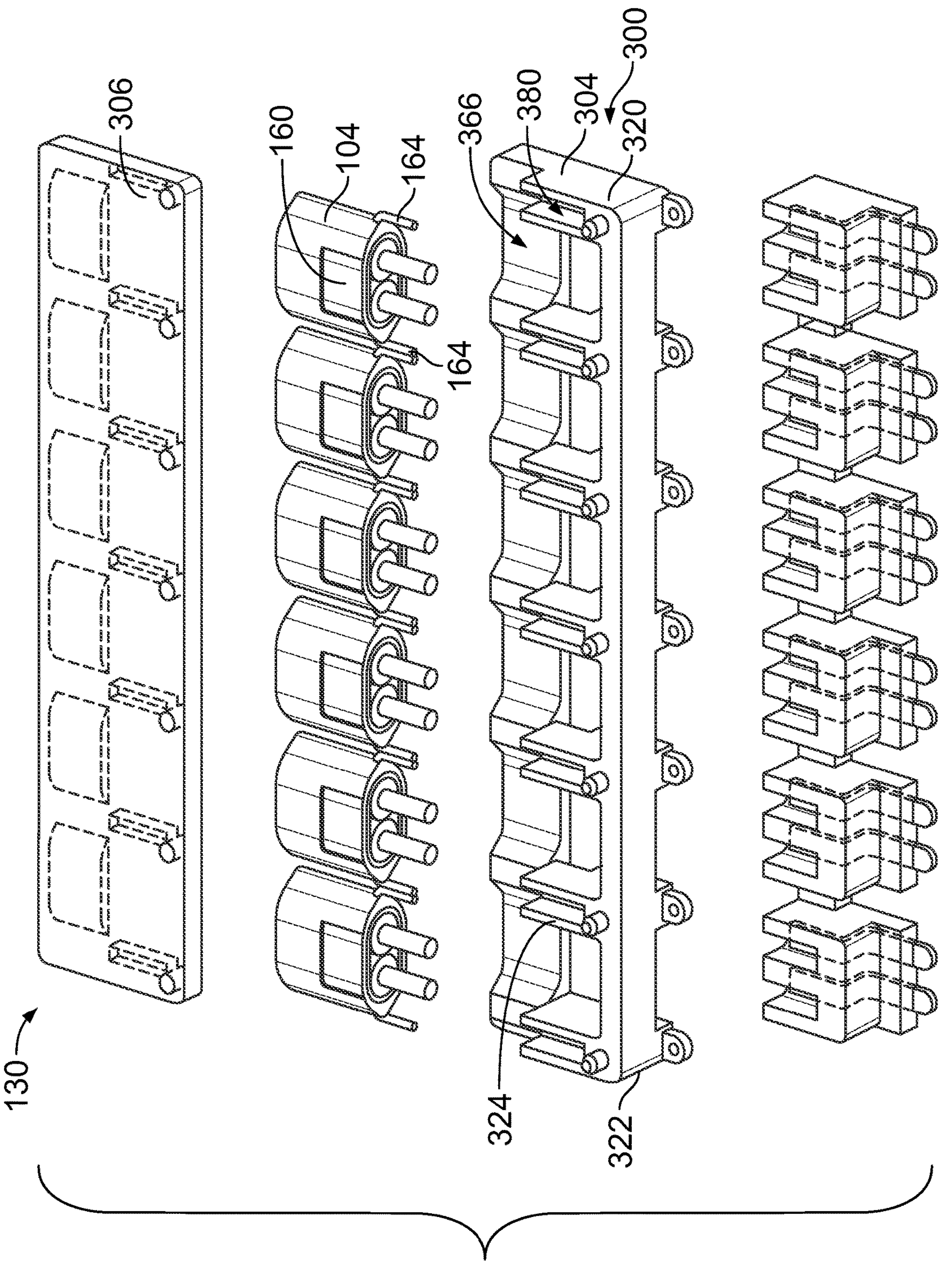
FIG. 19 is an exploded view of a portion of the cable card assembly in accordance with an exemplary embodiment.
Figure 20:
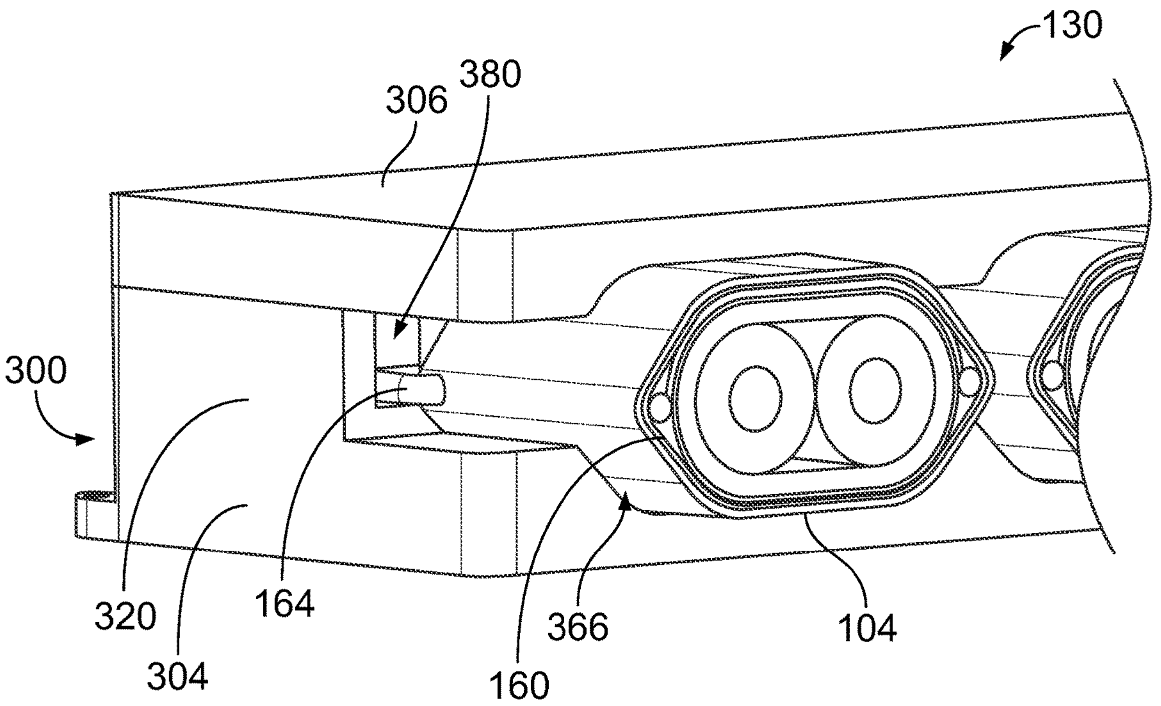
FIG. 20 is a rear perspective view of a portion of the cable card assembly in accordance with an exemplary embodiment.

FIG. 18 is a front perspective view of a portion of the cable card assembly 130 in accordance with an exemplary embodiment. FIG. 19 is an exploded view of a portion of the cable card assembly 130 in accordance with an exemplary embodiment. FIG. 20 is a rear perspective view of a portion of the cable card assembly 130 in accordance with an exemplary embodiment.

In the illustrated embodiment, the ground bus 300 is a multipiece structure with the inner and outer bus members 304, 306 being diecast parts. The ends of the cables 104 are received in the cable pockets 366 between the inner bus member 304 and the outer bus member 306. The inner bus member 304 and the outer bus member 306 are configured to electrically connect directly to the cable shields 160 of the cables 104. In an exemplary embodiment, the divider walls 324 and the side walls 320, 322 of the inner bus member 304 include drain wire pockets 380 that receive the drain wires 164. The drain wires 164 are electrically connected to the inner bus member 304, such as by a compression connection or by laser welding or soldering.

Figure 21:
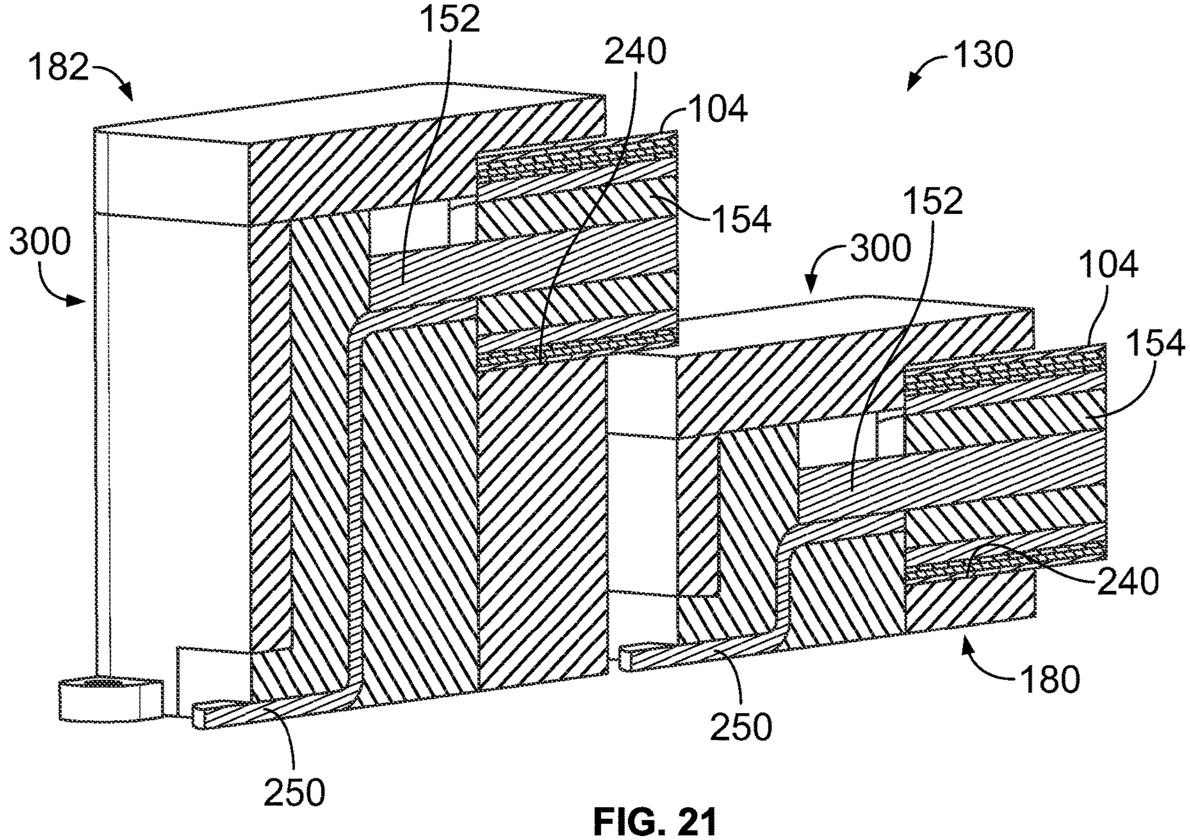
FIG. 21 is a front perspective, partial sectional view of a portion of the cable card assembly in accordance with an exemplary embodiment.

FIG. 21 is a front perspective, partial sectional view of a portion of the cable card assembly 130 in accordance with an exemplary embodiment. FIG. 21 illustrates the first assembly 180 and the second assembly 182 located forward of and extending over the first assembly 180 in the stacked or flyover arrangement. The assemblies 180, 182 are shown using the multi-piece ground bus 300 shown in FIGS. 18-20. The cable supports 240 of the assemblies 180, 182 are located at different heights to support the cables 104 at different heights and allow the signal conductors 150 (shown in FIG. 13), 152 to extend axially from the insulators 154 to the signal contacts 250. FIG. 21 illustrates the mating tabs 254 of the signal contacts 250 having lap weld portions.

Figure 22:
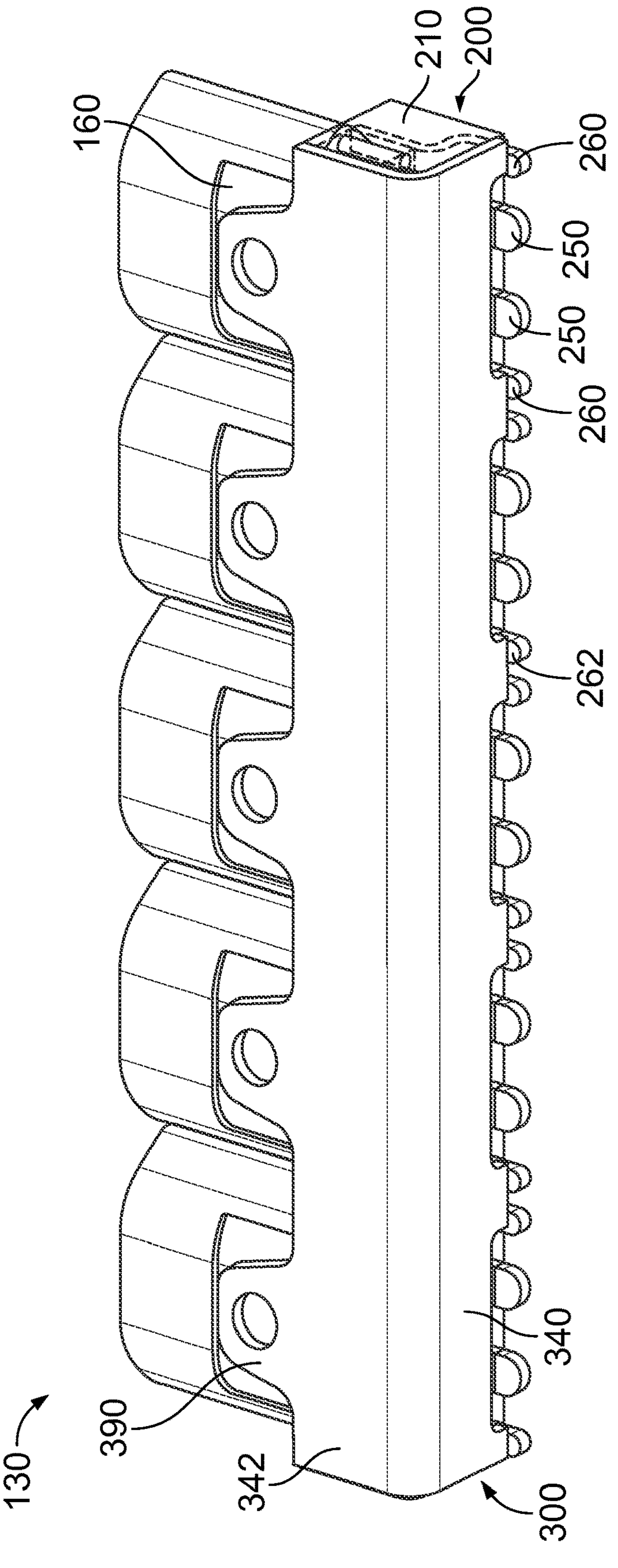
FIG. 22 is a front perspective view of a portion of the cable card assembly in accordance with an exemplary embodiment.
Figure 23:
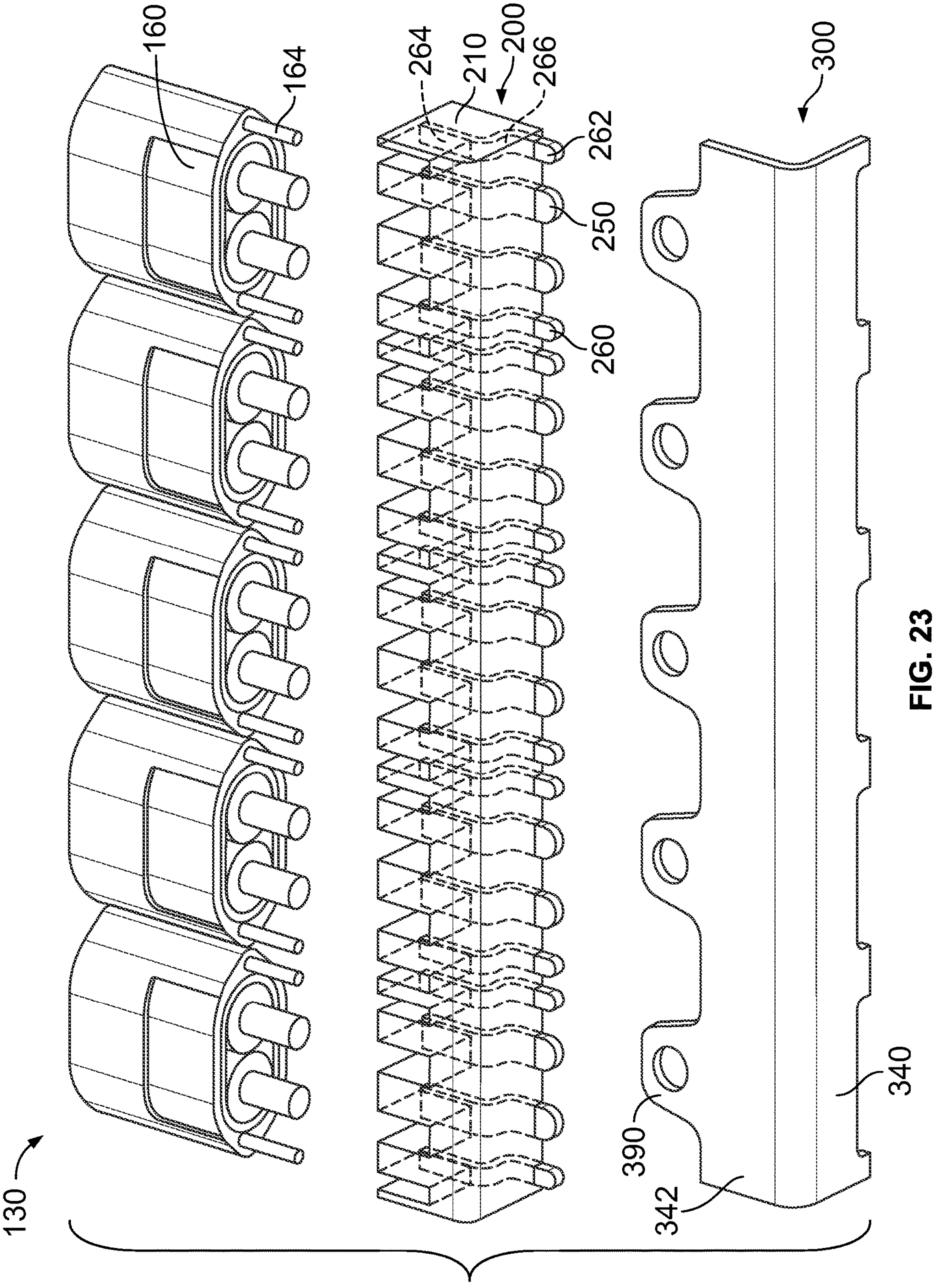
FIG. 23 is an exploded view of a portion of the cable card assembly in accordance with an exemplary embodiment.

FIG. 22 is a front perspective view of a portion of the cable card assembly 130 in accordance with an exemplary embodiment. FIG. 23 is an exploded view of a portion of the cable card assembly 130 in accordance with an exemplary embodiment.

In the illustrated embodiment, the ground bus 300 is a stamped and formed ground bus. The ground bus 300 may be a single piece structure. Alternatively, the ground bus 300 may be a multi-piece structure, such as multiple stamped and formed pieces. The stamped ground bus 300 includes the front wall 340 and the outer wall 342. The front wall 340 is bent generally perpendicular to the outer wall 342 in the illustrated embodiment. The outer wall 342 includes ground connection members 390 at the rear. The ground connection members 390 are configured to be connected to the cable shields 160, such as being soldered to the cable shields 160.

In an exemplary embodiment, the contact assembly 200 includes ground contacts 260 in addition to the signal contacts 250. The ground contacts 260 are electrically connected to the drain wires 164. The ground contacts 260 may be formed as part of the leadframe with the signal contacts 250. The ground contacts 260 are routed through the contact holder 210 between the drain wires 164 and the circuit card 132 (FIG. 2). The ground contacts 260 are located between the pairs of the signal contacts 250 to provide shielding between the pairs of the signal contacts 250. In an exemplary embodiment, the ground contacts 260 are stamped and formed contacts. Each ground contact 260 includes a base tab 262 and a mating tab 264. The ground contact 260 includes a transition portion 266 between the base tab 262 and the mating tab 264. The base tab 262 is configured to be terminated to the corresponding circuit conductor 144 (shown in FIG. 3) of the circuit card 132. The mating tab 264 is configured to be terminated to the corresponding drain wire 164.

Figure 24:
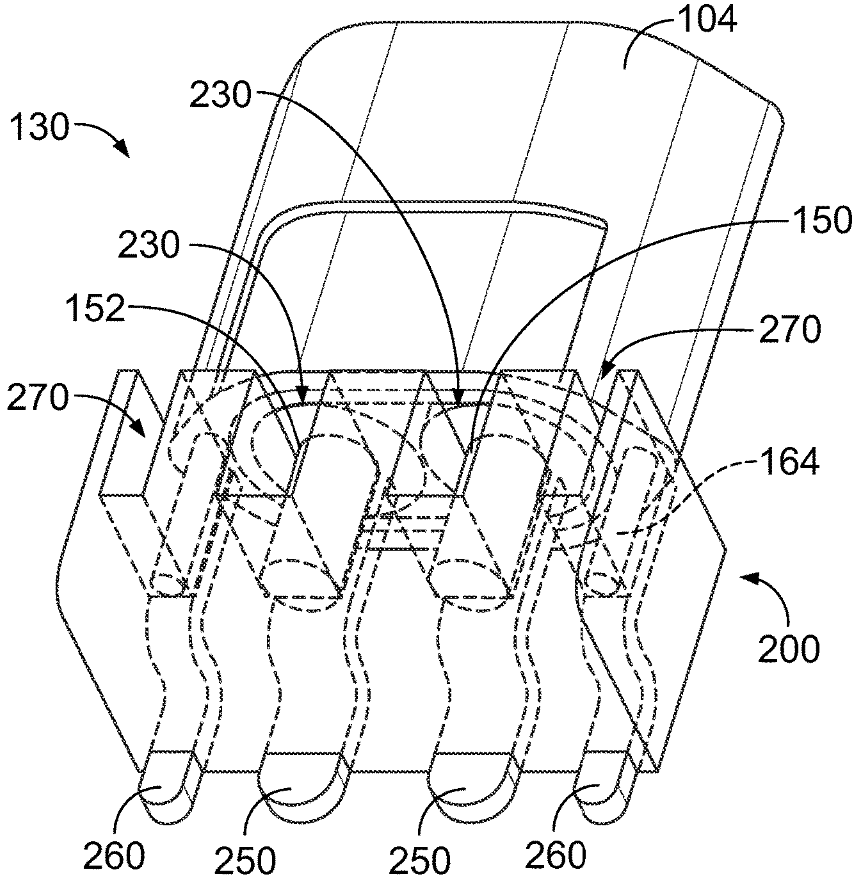
FIG. 24 is a front perspective view of a portion of the cable card assembly in accordance with an exemplary embodiment showing one of the cables coupled to the contact assembly.

FIG. 24 is a front perspective view of a portion of the cable card assembly 130 in accordance with an exemplary embodiment showing one of the cables 104 coupled to the contact assembly 200. The signal conductors 150, 152 are received in corresponding contact channels 230 to mate with the signal contacts 250. The drain wires 164 are received in corresponding drain wire channels 270 to mate with the ground contacts 260.

Figure 25:
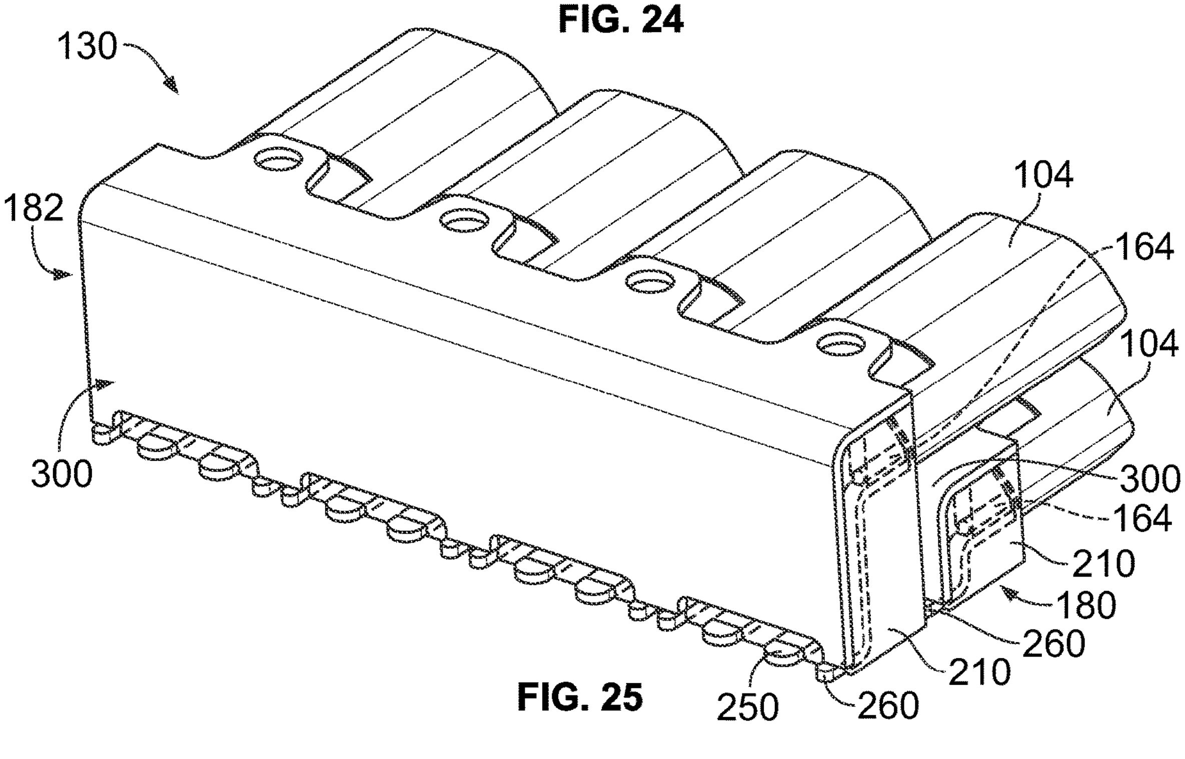
FIG. 25 is a front perspective view of a portion of the cable card assembly in accordance with an exemplary embodiment.
Figure 26:
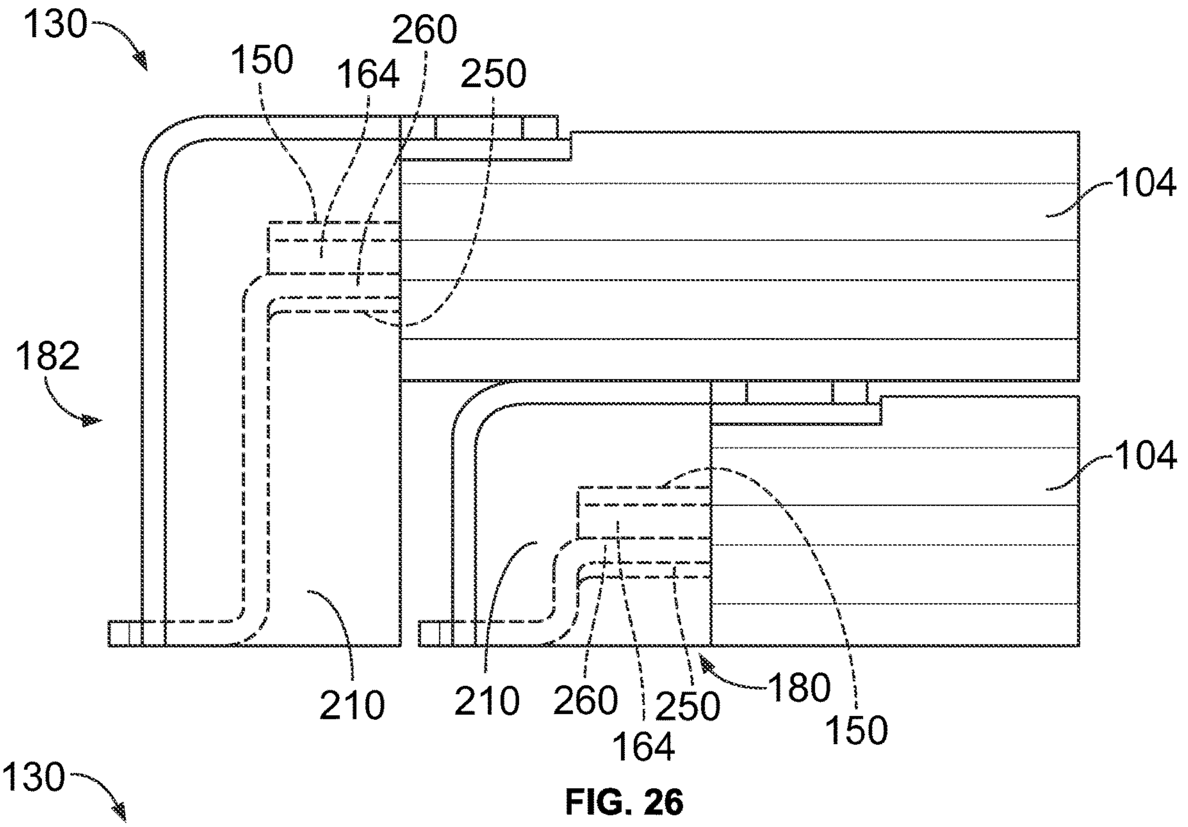
FIG. 26 is a side view of a portion of the cable card assembly in accordance with an exemplary embodiment.

FIG. 25 is a front perspective view of a portion of the cable card assembly 130 in accordance with an exemplary embodiment. FIG. 26 is a side view of a portion of the cable card assembly 130 in accordance with an exemplary embodiment. FIGS. 25 and 26 illustrate the first assembly 180 and the second assembly 182 located forward of and extending over the first assembly 180 in the stacked or flyover arrangement. The assemblies 180, 182 are shown using the stamped and formed ground buses 300 shown in FIGS. 22-23. The contact holders 210 support the cables 104 at different heights and allow the drain wires 164 to extend axially forward to the ground contacts 260.

Figure 27:
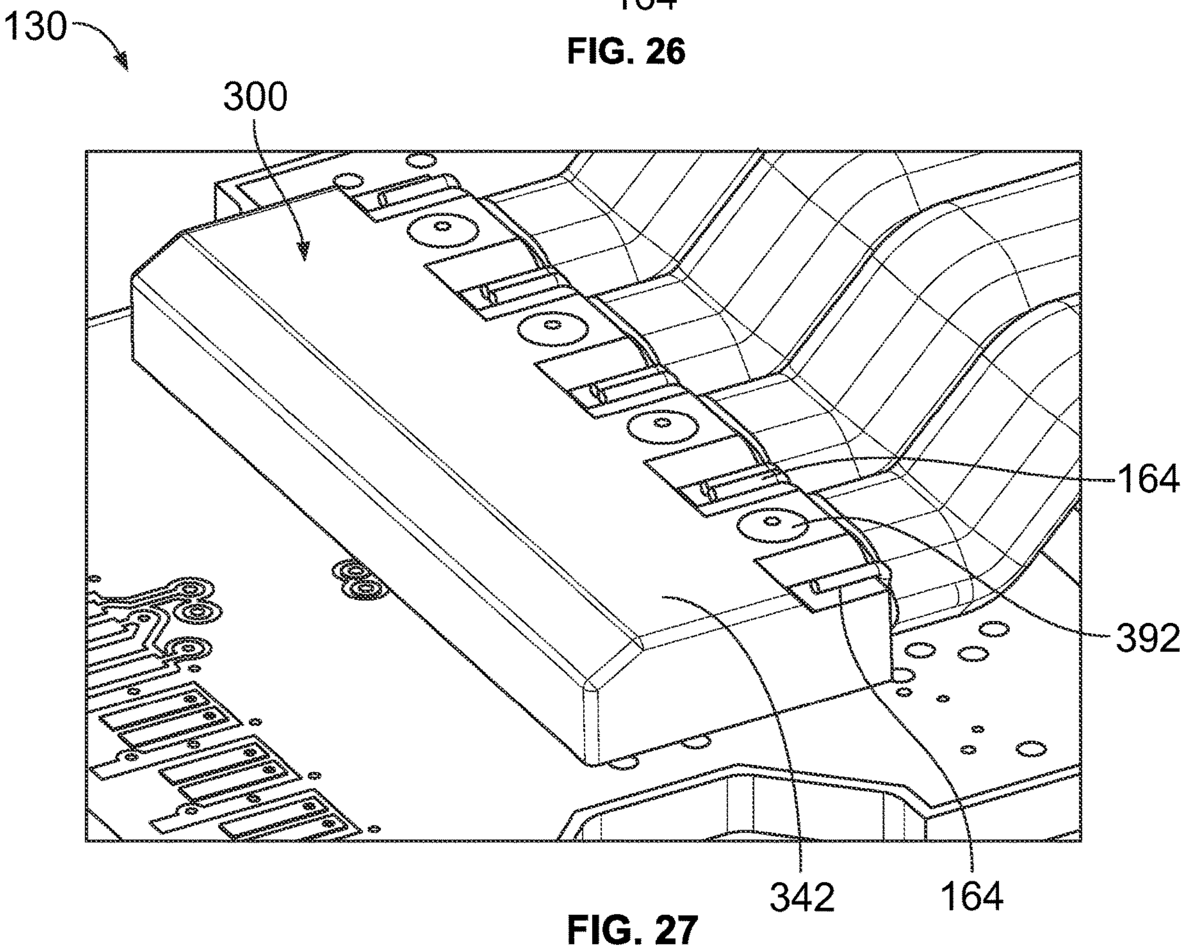
FIG. 27 is a front perspective view of a portion of the cable card assembly in accordance with an exemplary embodiment.

FIG. 27 is a front perspective view of a portion of the cable card assembly 130 in accordance with an exemplary embodiment. In the illustrated embodiment, the ground bus 300 is a diecast ground bus. The ground bus 300 may be a single piece structure. The drain wires 164 are routed to the outer wall 342 and are received in pockets at the outer wall 342. The drain wires 164 may be soldered to the exterior of the ground bus 300. The ground bus 300 includes ground connection members 392 that provide connections between the ground bus 300 and the cable shields (not shown). The ground connection members 392 may be solder lugs received in openings in the ground bus 300.

Figure 28:
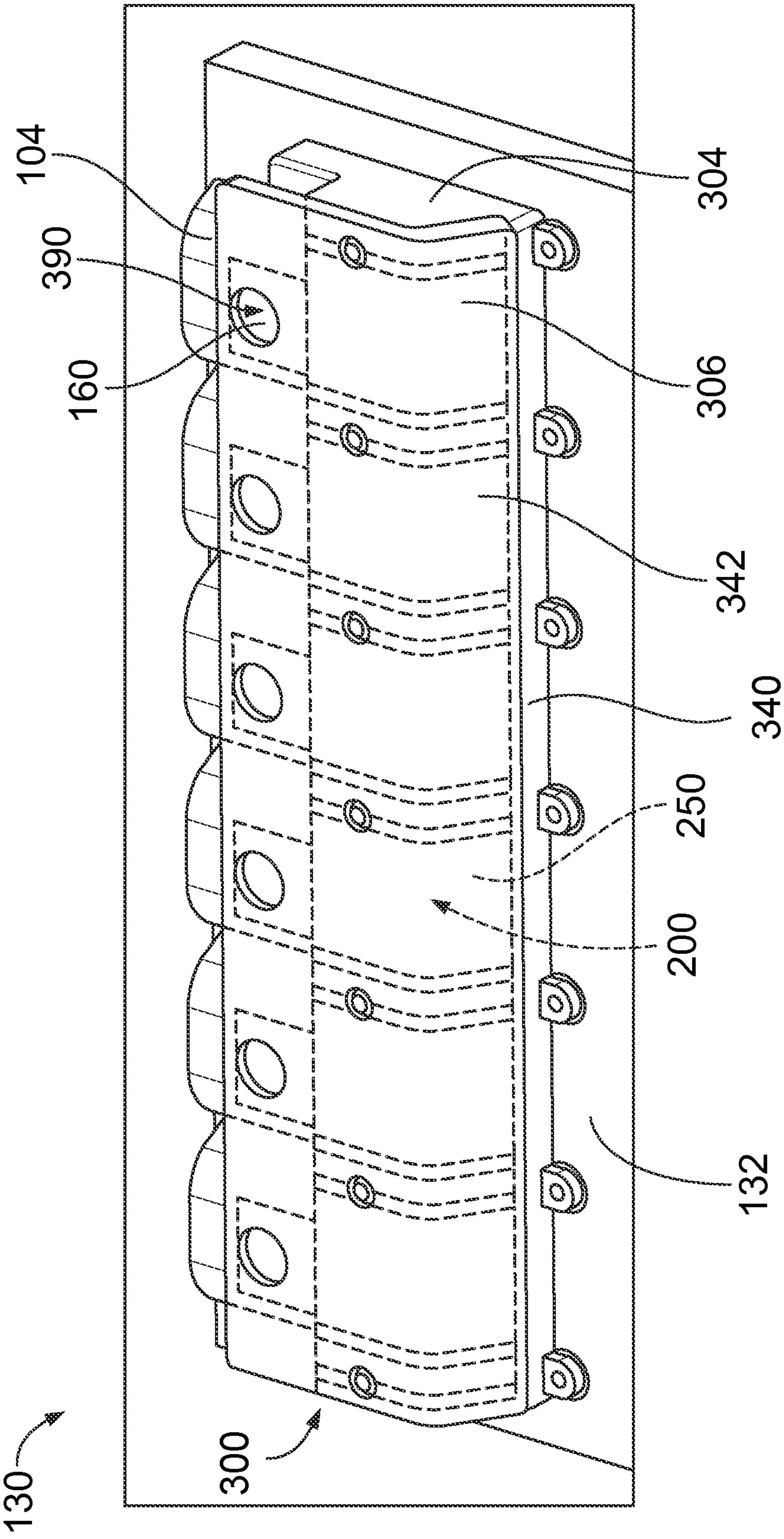
FIG. 28 is a front perspective view of a portion of the cable card assembly in accordance with an exemplary embodiment.

FIG. 28 is a front perspective view of a portion of the cable card assembly 130 in accordance with an exemplary embodiment. In the illustrated embodiment, the ground bus 300 is a is a diecast ground bus. The ground bus 300 is a multi-piece structure including the inner bus member 304 and the outer bus member 306. The inner bus member 304 includes the front wall 340. The outer wall 342 includes ground connection members 390 at the rear. In the illustrated embodiment, the ground connection members 390 are openings for soldering or laser welding to the cable shields 160 of the cables 104.

In an exemplary embodiment, the contact assembly 200 is contained or enclosed within the ground bus 300. For example, the front wall 340 extends to the circuit card 132. The front wall 340 is located forward of the base ends of the signal contacts 250. For example, the inner bus member 304 and/or the outer bus member 306 surround or enclose the signal contacts 250 such that the signal contacts 250 are fully enclosed within the shield cavity (not shown) of the ground bus 300.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A cable card assembly for an electrical connector comprising:

a circuit card having an upper surface and a lower surface, the circuit card having a cable end, the circuit card having mating conductors for mating with a mating electrical connector, the circuit card having circuit conductors at the cable end, the circuit card having a ground plane;

cables terminated to the circuit card, the cables including signal conductors and cable shields surrounding the corresponding signal conductors to provide electrical shielding for the signal conductors, the signal conductors including exposed portions extending forward of the cable shields;

a contact assembly coupled to the circuit card and coupled to the cables, the contact assembly including a contact holder holding signal contacts, each signal contact including a base tab and a mating tab, the base tab being terminated to the corresponding circuit conductor, the mating tab being terminated to the corresponding signal conductor; and a ground bus separate and discrete from the contact assembly and being coupled to the contact assembly, the ground bus being electrically connected to the cable shields to electrically connect the cable shields of the cables, the ground bus being electrically connected to the ground plane of the circuit card.

2. The cable card assembly of claim 1, wherein the exposed portions of the signal conductors extend straight from insulators of the corresponding cables to the corresponding mating tabs.

3. The cable card assembly of claim 1, wherein the base tabs are non-coplanar with the exposed portions of the signal conductors.

4. The cable card assembly of claim 1, wherein the signal contacts transition vertically from the exposed portions of the signal conductors to the circuit conductors.

5. The cable card assembly of claim 1, wherein the signal contacts are formed from a lead frame, the contact holder being formed in place over the signal contacts.

6. The cable card assembly of claim 1, wherein the contact holder includes contact blocks separated by gaps, each contact block holding a pair of the signal contacts, the ground bus including divider walls forming shield pockets, each shield pocket receiving the corresponding contact block, the gaps receiving the corresponding divider walls, the divider walls provide shielding between the pairs of the signal contacts.

7. The cable card assembly of claim 1, wherein the contact holder includes conductor channels receiving the corresponding signal conductors, the mating tabs extending into and being exposed in the corresponding contact channels, the signal conductors being terminated to the mating tabs in the contact channels.

8. The cable card assembly of claim 1, wherein the cables include drain wires, the drain wires being terminated to the ground bus.

9. The cable card assembly of claim 1, wherein the ground bus includes a stamped and formed body.

10. The cable card assembly of claim 1, wherein the contact holder includes a front and a rear, the rear facing the cables, the contact holder including an inner end and an outer end, the inner end facing the circuit card, the ground bus substantially covering the front and substantially covering the outer end of the contact holder.

11. The cable card assembly of claim 1, wherein the ground bus includes a shell covering the contact assembly, the ground bus further comprising a ground connection member connected between the shell of the ground bus and the cable shields of the cables.

12. The cable card assembly of claim 1, wherein the ground bus includes an inner bus member and an outer bus member, the inner bus member located between the outer bus member and the circuit card, the cables being received between the inner bus member and the outer bus member.

13. The cable card assembly of claim 1, wherein the ground bus includes an inner bus member and an outer bus member, the inner bus member located between the outer bus member and the circuit card, the inner bus member including contact assembly pockets and cable pockets, the inner bus member including divider walls between the contact assembly pockets, the contact assembly being received in the contact assembly pockets, the cables being received in the cable pockets, the outer bus member closing the contact assembly pockets and the cable pockets.

14. The cable card assembly of claim 13, wherein the outer bus member includes outer cable pockets receiving the cables, the inner bus member and the outer bus member circumferentially surrounding and engaging the cable shields to electrically connect to the cable shields.

15. The cable card assembly of claim 13, wherein the divider walls include divider wall pockets receiving drain wires of the cables to electrically connect the ground bus to the drain wires.

16. The cable card assembly of claim 1, wherein the ground bus includes a first side wall, a second side wall, a front wall, and an outer wall defining a cavity, the contact assembly located at an inner end of the ground bus, the cables extending from a rear end of the ground bus.

17. The cable card assembly of claim 1, wherein the cables include drain wires, the drain wires extending to an exterior of the ground bus for electrical connection to an exterior of the ground bus.

18. The cable card assembly of claim 1, wherein the circuit conductors are provided on the upper surface and the mating conductors are provided on the lower surface.

19. The cable card assembly of claim 1, wherein the circuit conductors are provided on the upper surface and the lower surface.

20. A cable card assembly for an electrical connector comprising:

a circuit card having an upper surface and a lower surface, the circuit card having a cable end at a rear of the circuit card, the circuit card having mating conductors for mating with a mating electrical connector, the circuit card having circuit conductors at the cable end, the circuit conductors arranged in a first row and a second row forward of the first row, the circuit card having a ground plane;

cables terminated to the circuit card, the cables including signal conductors and cable shields surrounding the corresponding signal conductors to provide electrical shielding for the signal conductors, the signal conductors including exposed portions extending forward of the cable shields, the cables including inner cables and outer cables, the inner cables being located between the outer cables and the circuit card;

a first contact assembly coupled to the circuit card and coupled to the inner cables, the first contact assembly including a first contact holder holding first signal contacts, each first signal contact including a base tab and a mating tab, the base tab being terminated to the corresponding circuit conductor in the first row, the mating tab being terminated to the signal conductor of the corresponding inner cable;

a second contact assembly coupled to the circuit card and coupled to the outer cables, the second contact assembly including a second contact holder holding second signal contacts, each second signal contact including a base tab and a mating tab, the base tab being terminated to the corresponding circuit conductor in the second row, the mating tab being terminated to the signal conductor of the corresponding outer cable;

a first ground bus separate and discrete from the first contact assembly and being coupled to the first contact assembly, the first ground bus being electrically connected to the cable shields of the inner cables to electrically connect the cable shields of the inner cables, the first ground bus being electrically connected to the ground plane of the circuit card; and a second ground bus separate and discrete from the second contact assembly and being coupled to the second contact assembly, the second ground bus being electrically connected to the cable shields of the outer cables to electrically connect the cable shields of the outer cables, the second ground bus being electrically connected to the ground plane of the circuit card.

21. The cable card assembly of claim 20, wherein the exposed portions of the signal conductors of the inner cables extend straight and wherein the exposed portions of the signal conductors of the outer cables extend straight and parallel to the exposed portions of the signal conductors of the inner cables.

22. The cable card assembly of claim 20, wherein the mating tabs of the second signal contacts are located forward of and further from the circuit card than the mating tabs of the first signal contacts.

23. The cable card assembly of claim 20, wherein the mating tabs of the first signal contacts are located a first distance from the base tabs of the first signal contact and wherein the mating tabs of the second signal contacts are located a second distance from the base tabs of the second signal contact, the second distance being greater than the first distance.

24. An electrical connector comprising:

a housing having walls forming a cavity, the housing having a mating end at a front of the housing configured to be mated with a mating electrical connector; and a cable card assembly received in the cavity of the housing, the cable card assembly including a circuit card, a contact assembly coupled to the circuit card, cables terminated to the contact assembly, and a ground bus coupled to the circuit card, the circuit card having an upper surface and a lower surface, the circuit card having a cable end and a mating end opposite the cable end, the circuit card including a ground plane, the circuit card having circuit conductors at the cable end, the circuit card having mating conductors at the mating end, the mating end of the circuit card configured to be plugged into a card slot of the mating electrical connector, the cables including signal conductors and cable shields surrounding the corresponding signal conductors to provide electrical shielding for the signal conductors, the signal conductors having exposed portions extending forward of the cable shields, the contact assembly including a contact holder holding signal contacts, each signal contact including a base tab and a mating tab, the base tab being terminated to the corresponding circuit conductor, the mating tab being terminated to the corresponding signal conductor, the ground bus being electrically connected to the cable shields to electrically connect the cable shields of the cables, the ground bus being electrically connected to the ground plane of the circuit card.

* * * * *